US009432990B2

(12) United States Patent
Birlik et al.

(10) Patent No.: US 9,432,990 B2
(45) Date of Patent: Aug. 30, 2016

(54) HYBRID MESH NETWORK

(71) Applicant: AIRTIES KABLOSUZ ILETISIM SAN. VE DIS TIC. A.S., Istanbul (TR)

(72) Inventors: Firat Birlik, Istanbul (TR); Muharrem Sarper Gokturk, Istanbul (TR); Ece Gelal, Urla (TR); Eren Soyak, Istanbul (TR)

(73) Assignee: Airties Kablosuz Iletisim San. Ve Dis Tic. A.S., Istanbul (TR)

( * ) Notice: Subject to any disclaimer, the term of this patent is extended or adjusted under 35 U.S.C. 154(b) by 0 days.

(21) Appl. No.: 14/166,040

(22) Filed: Jan. 28, 2014

(65) Prior Publication Data

US 2015/0055506 A1 Feb. 26, 2015

Related U.S. Application Data

(60) Provisional application No. 61/931,277, filed on Jan. 24, 2014, provisional application No. 61/881,294, filed on Sep. 23, 2013, provisional application No. 61/869,110, filed on Aug. 23, 2013.

(51) Int. Cl.
*H04W 72/04* (2009.01)
*H04W 16/10* (2009.01)
*H04W 40/24* (2009.01)
*H04W 24/02* (2009.01)
*H04W 92/20* (2009.01)
*H04W 88/10* (2009.01)
*H04W 84/18* (2009.01)

(52) U.S. Cl.
CPC ......... *H04W 72/0426* (2013.01); *H04W 16/10* (2013.01); *H04W 24/02* (2013.01); *H04W 40/24* (2013.01); *H04W 84/18* (2013.01); *H04W 88/10* (2013.01); *H04W 92/20* (2013.01)

(58) Field of Classification Search
CPC .......... H04W 72/0426; H04W 16/10; H04W 84/18; H04L 41/08–41/0896
USPC ................................... 370/254, 255
See application file for complete search history.

(56) References Cited

U.S. PATENT DOCUMENTS

| 2007/0286082 | A1* | 12/2007 | Hikspoors | ............... H04L 45/10 370/238 |
| 2008/0120177 | A1* | 5/2008 | Moscirella | .......... G06F 11/2023 705/14.12 |
| 2008/0137568 | A1* | 6/2008 | Ho | ........................ H04L 45/245 370/310 |

(Continued)

OTHER PUBLICATIONS

"AirTies Points Way to HD Video on Hybrid Wi-Fi/Powerline Networks", http://www.onlinereporter.com/2011/07/13/airties-points-way-to-hd-video-on-hybrid-wi-fipowerline-networks/, The Online Reporter, Jul. 13, 2011.

(Continued)

*Primary Examiner* — Mark Rinehart
*Assistant Examiner* — Kenneth P Hunt
(74) *Attorney, Agent, or Firm* — Harness, Dickey & Pierce, P.L.C.

(57) ABSTRACT

An access point is configured to pair with other access points in a network. The access point includes at least two interfaces configured to interface to other access points over a link layer therein using heterogeneous backhaul access technologies; and a memory having machine executable code, therein that, when executed by a processor, cause the at least two interfaces to pair with one or more of the other access points using configuration information stored within the memory.

23 Claims, 15 Drawing Sheets

(56) References Cited

U.S. PATENT DOCUMENTS

| | | | |
|---|---|---|---|
| 2009/0010269 A1* | 1/2009 | Larsson | H04L 45/22 370/400 |
| 2011/0164527 A1 | 7/2011 | Mishra et al. | |
| 2012/0236758 A1* | 9/2012 | Yonge, III | H04L 12/4633 370/255 |
| 2013/0136117 A1* | 5/2013 | Schrum et al. | 370/338 |
| 2014/0098796 A1* | 4/2014 | Xue | H04L 12/5692 370/336 |
| 2014/0269691 A1* | 9/2014 | Xue | H04L 45/125 370/389 |
| 2015/0113138 A1* | 4/2015 | Bahr | H04L 63/08 709/225 |

OTHER PUBLICATIONS

"IEEE Standard for a Convergent Digital Home Network for Heterogeneous Technologies; IEEE Std. 1905.1-2013", IEEE Standard, IEEE Piscataway, NJ, USA, Apr. 12, 2013, pp. 1-93, XP068050268, ISBN: 978-0-7381-8297-1.

European Search Report dated Jan. 5, 2015 for Application No. EP 14 16 7788.

* cited by examiner

FIG. 8

| Dest. ID | Src. ID (opt) | Next Hop ID | Next Hop Int. | Prev. Hop ID | Prev. Hop Int. | SSN | DSN | Cost | | Idle Timer (opt) | TimeStamp Forward a RREQ |
|---|---|---|---|---|---|---|---|---|---|---|---|
| | | | | | | | | Interface 1: | | | |
| | | | | | | | | Interface 2: | | | |
| | | | | | | | | Interface 3: | | | |

Route Discovery

Propogate RREQ

FIG. 15

DOWNSTREAM RREQ

1501 — Routing Table at AP 200-4, acting as AP 200-S

| Dest. ID | Src. ID (opt) | Next Hop | Next Hop Int. | Prev. Hop | Prev. Hop Int. | SSN | DSN | Cost | | Idle Timer (opt) | TimeStamp |
|---|---|---|---|---|---|---|---|---|---|---|---|
| 200-1 | 200-4 | - | - | - | - | 1 | - | Interface 1: | - | 0 | Time RREQ sent by 200-4 |
|  |  |  |  |  |  |  |  | Interface 2: | - |  |  |
|  |  |  |  |  |  |  |  | Interface 3: | - |  |  |

1502 — Routing Table at AP 200-3, updated based on RREQ from AP-2004

| Dest. ID | Src. ID (opt) | Next Hop | Next Hop Int. | Prev. Hop | Prev. Hop Int. | SSN | DSN | Cost | | Idle Timer (opt) | TimeStamp |
|---|---|---|---|---|---|---|---|---|---|---|---|
| 200-1 | 200-4 | - | - | 200-4 | PLC | 1 | - | Interface 1: | - | 0 | Time RREQ sent by 200-3 |
|  |  |  |  |  |  |  |  | Interface 2: | $P_{4,3}$ |  |  |
|  |  |  |  |  |  |  |  | Interface 3: | - |  |  |

1503 — Routing Table at AP 200-1, updated based on RREQ from 200-3

| Dest. ID | Src. ID (opt) | Next Hop | Next Hop Int. | Prev. Hop | Prev. Hop Int. | SSN | DSN | Cost | | Idle Timer (opt) | TimeStamp |
|---|---|---|---|---|---|---|---|---|---|---|---|
| 200-1 | 200-4 | 200-1 | PLC | 200-3 | PLC | 1 | 1 | Interface 1: | - | 0 | Time RREP sent by 200-1 |
|  |  |  |  |  |  |  |  | Interface 2: | $P_{4,3} + P_{3,1}$ |  |  |
|  |  |  |  |  |  |  |  | Interface 3: | - |  |  |

UPSTREAM RREP

1504 — Routing Table at AP 200-3, updated based on RREP from AP 200-1

| Dest. ID | Src. ID (opt) | Next Hop | Next Hop Int. | Prev. Hop | Prev. Hop Int. | SSN | DSN | Cost | | Idle Timer (opt) | TimeStamp |
|---|---|---|---|---|---|---|---|---|---|---|---|
| 200-1 | 200-4 | 200-1 | PLC | 200-4 | PLC | 1 | 1 | Interface 1: | - | 0 | Time RREP sent by 200-3 |
|  |  |  |  |  |  |  |  | Interface 2: | $P_{3,1}$ |  |  |
|  |  |  |  |  |  |  |  | Interface 3: | - |  |  |

1505 — Routing Table at AP 200-4, updated based on RREP from 200-3

| Dest. ID | Src. ID (opt) | Next Hop | Next Hop Int. | Prev. Hop | Prev. Hop Int. | SSN | DSN | Cost | | Idle Timer (opt) | TimeStamp |
|---|---|---|---|---|---|---|---|---|---|---|---|
| 200-1 | 200-4 | 200-3 | PLC | - | - | 1 | 1 | Interface 1: | - | 0 | Time table is updated at source |
|  |  |  |  |  |  |  |  | Interface 2: | $P_{4,3}$ |  |  |
|  |  |  |  |  |  |  |  | Interface 3: | - |  |  |

HYBRID MESH NETWORK

PRIORITY INFORMATION

This application claims priority from U.S. Provisional Application Nos. 61/869,110 filed Aug. 23, 2013, 61/881,294 filed Sep. 23, 2013 and 61/931,277 filed Jan. 24, 2014, the contents of which are incorporated herein by reference in their entirety.

BACKGROUND

An access point (AP) may provide networking capabilities to user equipment (UEs) connected thereto. To increase the coverage area provided to the UEs, a plurality of APs may be linked together to form a local access network (LAN) such that different ones of the APs service different areas to extend the coverage area of the network. The plurality of APs may be connected using various network topologies. These topologies may be divided into infrastructure networks and ad-hoc networks. In ad-hoc networks, the APs may not be supported by centralized infrastructure, but rather communicate directly with other APs in the network.

Mesh networks are a type of ad-hoc network topology in which the APs cooperate to distribute data within the network. The data may be distributed from a source AP to a destination AP using routing techniques which propagate the data along a path by hopping from node-to-node until the destination is reached. A source UE, wishing to send data to a destination UE, may send the data to its associated source AP and the data may propagate over the mesh network between interfaces that interconnect various APs between the source AP and a destination AP associated with the destination UE.

Conventionally, APs within a mesh network utilize a single interface associated with an access technology to communicate therebetween. Therefore, these conventional mesh networks may be limited to the particular performance characteristics, capabilities and capacity/range tradeoffs of the shared access technology. For example, if the interfaces of the APs utilize a wireless access technology (e.g. 802.11 or Bluetooth) as their shared access technology to communicate therebetween, the network capacity associated with the wireless technology is shared among all the APs, which may lead to an increase in interference, latency and/or packet loss.

SUMMARY

At least one example embodiment relates to an access point configured to pair with other access points in a network.

In at least one embodiment, the access point includes at least two interfaces configured to interface to other access points over a link layer therein using heterogeneous backhaul access technologies; and a memory having machine executable code therein that, when executed by a processor, cause the at least two interfaces to pair with one or more of the other access points using configuration information stored within the memory.

In at least one embodiment, the machine executable code, when executed by the processor, causes the processor to pair with the other access points by, determining if the access point is a registrar or an enrollee based on whether the access point possesses configuration information that is valid for the network; establishing a secure connection to one of the other access points; receiving, over the secure connection, the configuration information from the other access point, if the determining determines that the access point is the enrollee; and sending, over the secure connection, the configuration information to the other access point, if the determining determines that the access point is the registrar; and interfacing, the at least two interfaces, to one or more of the other access points via a link layer connection therebetween based on the configuration information.

In at least one embodiment, the machine executable code, when executed by the processor, causes the processor to interface the at least two interfaces to the one or more other access points based on a Media Access Control (MAC) address associated with interfaces of the one or more other access points.

In at least one embodiment, the machine executable code, when executed by the processor, causes the processor to initiate a pairing procedure in response to a user request to pair with the one or more other access points such that upon receiving the user request the pairing procedure with the one or more other access points is performed autonomously.

In at least one embodiment, upon interfacing to the one or more other access points, the machine executable code, when executed by the processor, causes the processor to, determine a cost associated with forwarding data to each of the one or more other access points over each of the at least two interfaces; and update a forwarding table stored within the memory based on the determined costs.

In at least one embodiment, the backhaul access technologies that are heterogeneously utilized by the at least two interfaces allow the access point to select different collision domains to communicate with the other access points.

In at least one embodiment, the machine executable code, when executed by the processor, causes the processor to, set the access point as a registrar if network parameters thereat change; and send, over a secure connection, updated configuration information to the other access points, the updated configuration information including an indication of the changed network parameters.

In at least one embodiment, the machine executable code, when executed by the processor, causes the processor to increment a configuration sequence number associated with the updated configuration information if the network parameters thereat change.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the embodiments.

FIG. 8 illustrates a forwarding table according to an example embodiment;

FIG. 15 illustrates an example of a forwarding table generated during the forwarding of data within a Hybrid Media Mesh Network (HyMN) according to an example embodiment.

DETAILED DESCRIPTION

Figure 1:
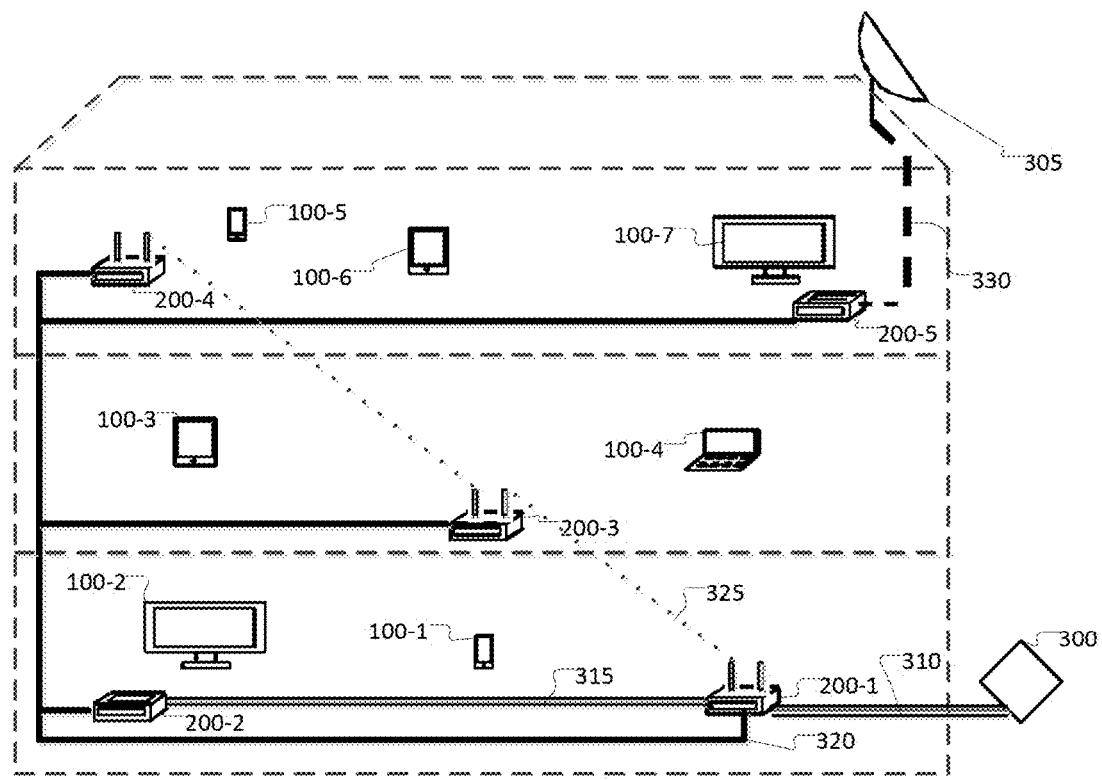
FIG. 1 illustrates a block diagram showing a network environment according to an example embodiment.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional operations not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. However, example embodiments are not limited to these given implementations.

As used herein, the term "user equipment" (UE) may be considered synonymous to, and may hereafter be occasionally referred to, as a phone, wirelessly equipped laptop, a mobile, mobile unit, mobile user, subscriber, user, remote station, access terminal, tablet, receiver, smart television, etc., and may describe a remote user of wired or wireless resources in a network. The term "Access Point" (AP) may be considered synonymous to and/or referred to as a wired and/or wireless router, hub, switch, a public gateway, a public/private gateway, and/or other source of audio and/or data transmission usable by various UEs and may describe equipment that provides data and/or audio connectivity between the network and one or more UEs.

FIG. 1 illustrates a block diagram showing a network environment according to an example embodiment.

Referring to FIG. 1, a networking environment may include various pieces of User Equipment (UEs) 100, (APs) 200 and other networking equipment arranged throughout the networking environment.

Each of the UEs 100 may be a mobile cellular device, a Personal Computer (PC), a tablet, a laptop, a smart television, a digital video recorder (DVR), a set top box, or the like. Each of the UEs 100 may be connected to one or more of the APs 200 via one or more end-user access technologies, such as Ethernet and Wi-Fi based technologies. However, example embodiments are not limited thereto and the UEs 100 and the APs 200 may be connected via other end user access technologies.

Each of the APs 200 may be interconnected to other ones of the APs 200 via interfaces 210 therein that utilize a backhaul access technology to form a mesh network. The backhaul access technologies utilized by the APs 200 may include Wi-Fi (e.g., IEEE 802.11b/g/n/ac), Bluetooth, Power Line Communication (PLC) (e.g., IEEE P1901, HomePlugAV or G.hn (G.9960), Multimedia over Coax Alliance (MoCA), Ethernet and the like. However, example embodiments are not limited thereto and the APs 200 may be interconnected via other backhaul access technologies.

At least two of the APs 200 may each have at least two interfaces 210 therein, where each of the interfaces 210 at a particular one of the APs 200 utilize a different backhaul access technology such that the at least two APs 200 are interconnected via at least two of the backhaul access technologies to form a Hybrid Media Mesh Network (HyMN). The HyMN network may signify any mesh network where at least two of the APs 200 are interconnected via at least two heterogeneous backhaul access technologies.

For example, APs 200-1, 200-2, 200-3, 200-4 and 200-5 each include a MoCA interface that interconnects the aforementioned APs 200 via a power line 320. Likewise, one or more of the APs, for example APs 200-1 and 200-2, each include Ethernet interfaces that interconnect the aforementioned APs via an Ethernet line 315. Additionally, one or more of the APs, for example APs 200-1, 200-3 and 200-4 each include a WiFi interface (e.g. 2.4 GHz and/or 5 GHz Wi-Fi) that interconnects the aforementioned APs over a WiFi Protocol via an air medium 325.

Further, one or more of the APs, for example AP 200-5, may be connected to a cable provider via coaxial cable 330 and a satellite link 305. One of the APs, for example AP 200-1, may be a gateway (GW) that is connected to the Internet 300 via a data line 310.

As discussed herein, a processor in each of the APs 200 executes computer code stored in memory that, when executed, autonomously configures and maintains the HyMN network without user interaction and performs on-the-fly route selection and seamless handover among various interfaces of the APs 200. Thus, the APs 200 increase the ease of managing a mesh network while improving the aggregate throughput in the data communicated between the APs 200.

Figure 2:
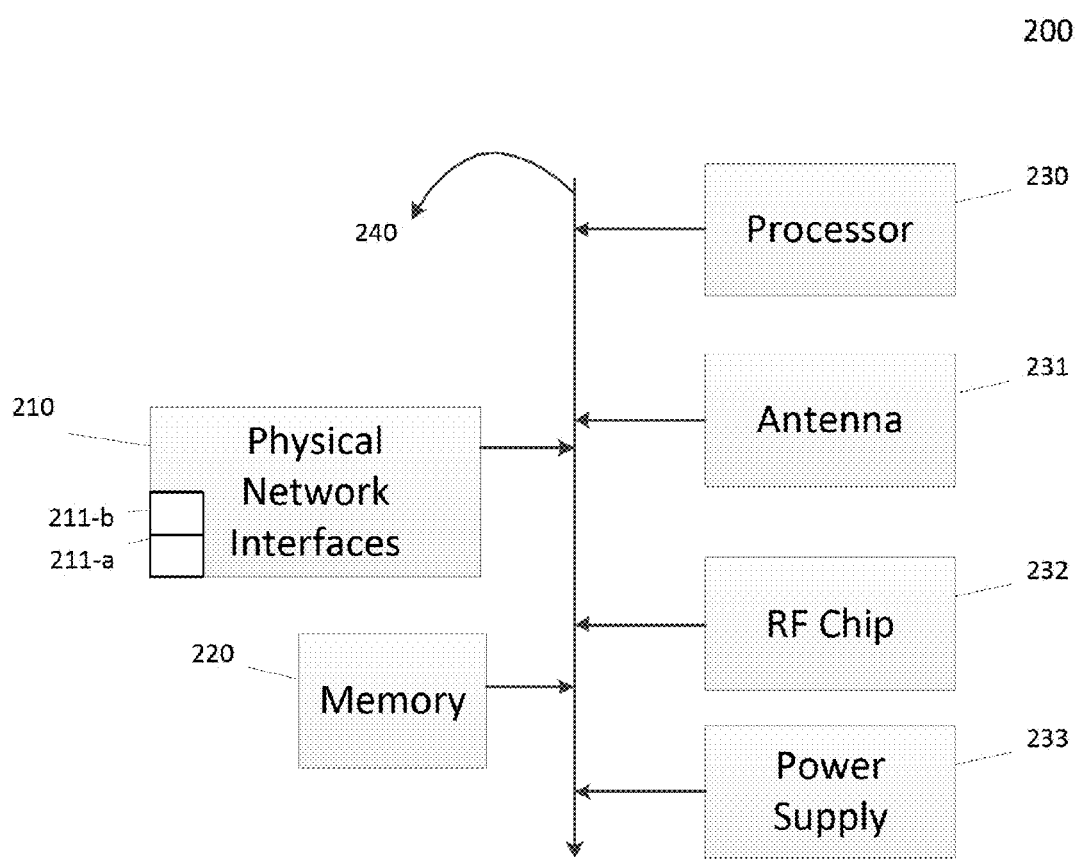
FIG. 2 illustrates a diagram of an Access Point (AP) utilized in a network environment according an example embodiment.

FIG. 2 illustrates a diagram of an access point utilized in a network environment according an example embodiment.

Referring to FIG. 2, each of the APs 200 includes, for example, network interfaces 210, a memory 220, a processor 230, an antenna 231, an RF chip 232, a power supply and a data bus 240. The network interfaces 210 includes at least two network interfaces, for example, a first network interface 210-1, a second network interface 210-2, and a third network interface 210-3.

The network interfaces 210, memory 220, processor 230, antenna 231 and RF chip 232 are adapted to send data to and/or receive data from one another using the data bus 240. Further, the network interfaces 210, memory 220, processor 230, antenna 231, RF chip 232 receive an operating power from the power supply 233. In an illustrative embodiment, the power supply 233 is connected to a power source via a power plug. In an illustrative embodiment, the power plug is connected to the power line 320.

Each of the network interfaces 210 includes ports 211 to receive and/or transmit signals using a transmitter and/or a receiver. For example, a first port 211-a is configured to receive and/or transmit Ethernet signals and a second port 211-b is configured to receive and/or transmit MoCA signals. Further, the network interfaces utilizes the antenna 231 to transmit and/or receive wireless signals. The RF chip 232 processes radio frequency signals.

The transmitters comprise devices that include hardware and any necessary software for transmitting signals including, for example, data signals, control signals, and signal strength/quality information via the associated interface to other network elements in the network environment. The receivers comprise devices that include hardware and any necessary software for receiving signals including, for example, data signals, control signals, and signal strength/quality information via the associated interface to other network elements.

The memory 220 comprises any device capable of storing data including magnetic storage, flash storage, etc. The memory 220 may store various information utilized by the HyMN protocol, for example, a forwarding table containing various routing information and a configuration parameter list containing various configuration information discussed in more detail below.

The processing unit 230 comprises any device capable of processing data including, for example, a microprocessor configured to carry out specific operations based on input data, or capable of executing instructions included in computer readable code. The computer readable code may be stored on, for example, the memory 220.

Figure 3:
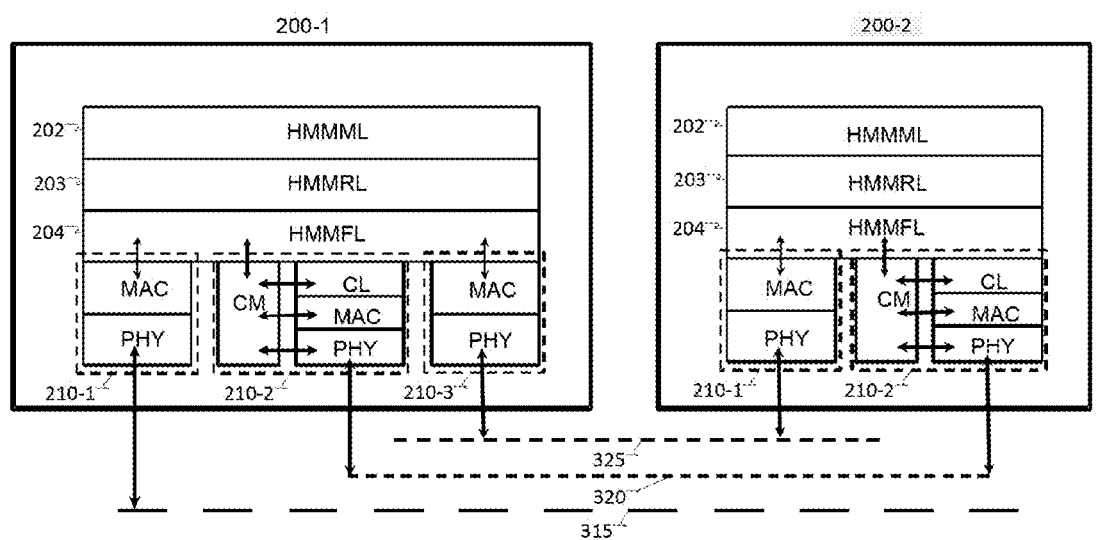
FIG. 3 illustrates a schematic diagram of access control layers of two Access Points (APs) utilized in a network environment according to an example embodiment.

FIG. 3 illustrates a schematic diagram of access control layers of two access points (APs) utilized in a network environment according to an example embodiment.

Referring to FIGS. 2 and 3, a first one of the APs 200-1 and a second one of the APs 200-2 each includes multiple interfaces 210. For example, the first AP 200-1 includes three physical interface circuits, namely a first physical network interface 210-1, a second physical interface 210-2 and a third physical interface 210-3. Likewise the second AP 200-2 may include two physical interface circuits, namely a first physical interface 210-1 and a second physical interface 210-2.

In the illustrated embodiment, the first network interface 210-1 comprises a Wireless Communication Interface configured to interface with a wireless network, the second network interface 210-2 comprises be a Power Line Communication (PLC) interface configured to interface with a power line cable, and the third network interface 210-3 comprises an Ethernet interface configured to interface with an Ethernet network.

In the illustrated embodiment, each of the interfaces 210-1 to 210-3 is controlled by an associated Medium Access Controller (MAC). Further, the PLC interface includes a Connection Manager (CM) and a Convergence Layer (CL). The Connection Manager CM of the interface 210 of the first AP 200-1 is adapted to evaluate a PLC connection specification and setup a connection with a corresponding Connection Manager CM on an interface 210 of another the second AP 200-2. The Convergence Layer CL serves as an intermediary between a Forwarding Layer (HMMFL) 204 and the Medium Access Controller MAC. More specifically, the Convergence Layer CL is adapted to accept and process data, such as a packet classification, from the Forwarding Layer 204 prior to handing the data to the Medium Access Controller MAC.

The network interface 210 and the MAC constitutes a physical layer (Layer 1) in an Open Systems Interconnection (OSI) model (ISO/IEC 7498-1) that characterizes and standardizes the internal functions of the AP 200.

The processor 230 is adapted to operate within a data link layer (Layer 2) situated directly above the physical later in the OSI model. The link layer is subdivided into the Forwarding Layer (HMMFL) 204, a Routing Layer (HMMRL) 203, and Metric Layer (HMMML) 202. The APs 200 communicate with each other over the link layer to facilitate configuration of the HyMN network and routing between the APs 200 within the HyMN network.

When routing of data packets between APs 200 is facilitated within the Link layer, MAC addresses are used to identify the APs 200, unlike when data packets are transferred in the Network layer, which may utilize IP addresses. By utilizing the Link layer, each interface on an AP 200 (e.g. the Wireless Communication Interface 210-1, the PLC interface 210-2, Ethernet interface 210-3, etc.) has a built-in MAC address that uniquely identifies the interface 210. Therefore, by utilizing the link layer for routing data packets data packets the MAC addresses are used to identify the proper interface 210.

In contrast, in L3 Network layer routing, data packets travelling from a source to a destination are identified by IP addresses associated with the source and the destination. Therefore, every intermediate access point on the path from the source to the destination needs to process the data packet at the L3 layer in order to learn the next hop access point to forward the data packet to. Further, if each of the access points utilizes multiple interfaces to communicate therebetween, a MAC address of each interface must be mapped with an IP address so that the data packets are forwarded through the correct interfaces to the next hop access point. Thus, if routing is employed in the L3 layer by an access point utilizing multiple interfaces, each intermediate access point needs to process the data packets at the L3 layer and also map the MAC address of the interface to the IP address associated therewith so that the data packets are forwarded to the correct interface. The processing overhead for each of the APs to forward data packets at the L3 layer becomes a critical parameter for time-critical data transfer, such as voice and video traffic. As the number of intermediate APs between the source and the destination is increased, the effect of processing overhead proliferates; yielding increased end-to-end jitter and low end-to-end throughput.

In the HyMN network, the APs 200 contain machine executable code in the memory 220, that when executed by the processor 230, configures the processor 230 to forward the data packets using the L2 layer, such that the data packets never go up to the L3 layer, unless the packet reaches its final destination AP 200. Thus, intermediate APs 200 on the path from the source to the destination do not need to process every data packet at the L3 layer, resulting in a significant reduction in processing overhead.

Furthermore, when links are formed in L2 layer, the HyMN network composed of various APs 200 that are linked over different media become a single logical network. Hence, from the point of view of the source and the destination APs 200, there is a single entity that relays the data packet originated from the source to the destination such that the data packets are forwarded within the HyMN, as if the packets are forwarded within the L2 layer of a single AP 200. This approach is advantageous, as it not only enables quick link setup and quick link recovery, but also it provides seamless connectivity among the interfaces 210 of different APs 200.

The Forwarding Layer 204 and/or the Routing Layer 203 maintain a forwarding table that is utilized in conjunction with forwarding rules defined by the Routing layer to forwarding packets to one of the interfaces 210.

The Metric Layer computes a link cost associated with each of the interfaces 210 of the AP 200 based on information provided from the Routing Layer, such as link capacity, Quality of Services (QoS) parameters, and/or Central Processing Unit (CPU) load.

Hybrid Media Mesh Network Configuration

Figure 4:
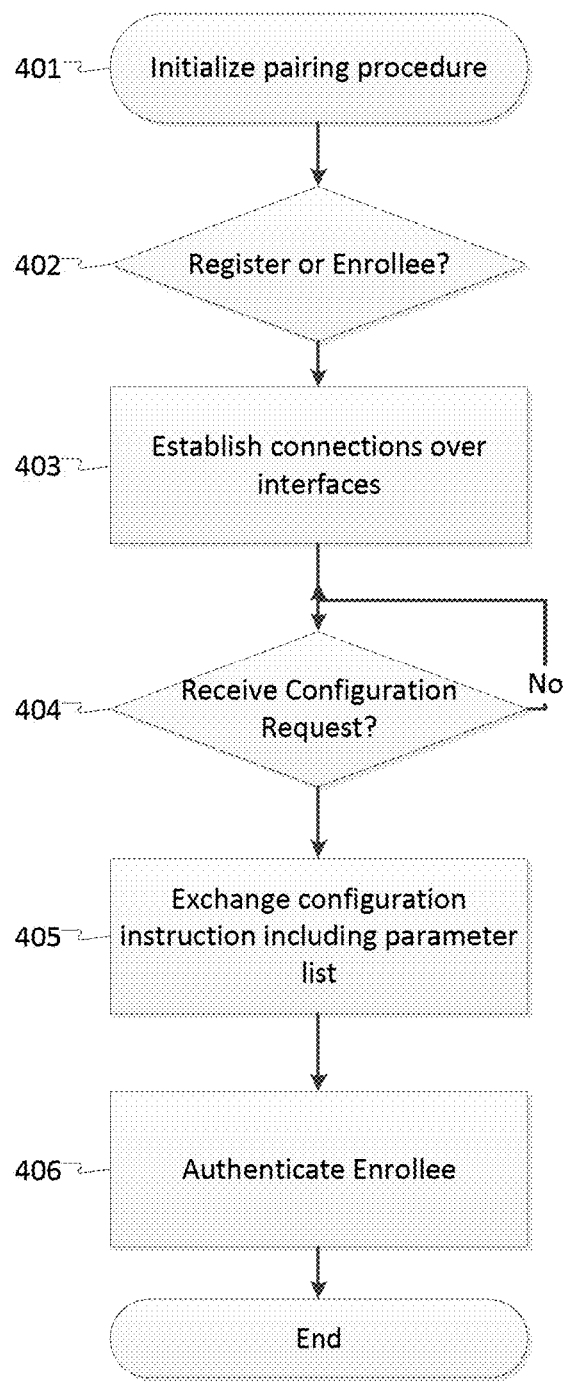
FIG. 4 illustrates a flow chart of a Registrar executing a Hybrid Media Mesh Network Configuration method according to an example embodiment.

FIG. 4 illustrates a flow chart of a Registrar executing a Hybrid Media Mesh Network Configuration method according to an example embodiment.

Referring to FIGS. 1-4, in operation 401, a first and second one of the access points (APs) 200 initializes a pairing procedure therebetween, in a Hybrid Media Mesh Network (HyMN) network. The second AP 200 may be part of a previously established HyMN network when the first AP 200 wishes to pair with the second AP 200. Alternatively, the second AP 200 may be an unconnected AP at the time the first AP 200 wishes to pair with the second AP 200.

In an illustrative embodiment, the pairing procedure is initialized upon activation by an operator of the HyMN network, for example, by pushing activation buttons located on the respective APs 200. However, example embodiments are not limited thereto, and the pairing procedure may be initialized via various other methods.

In operation 402, the first and second access points 200 determine which one of the first and second access points 200 will take on the role of a Registrar access point 200-1 and an Enrollee access point 200-2.

If only one of the first and second access points 200 contain HyMN configuration information in their associated memory 220, then one or more of the first and second access points 200 designate the access point 200 that contains the HyMN configuration information as the Registrar 200-1.

If both of the first and second access points 200 contain HyMN configuration information within their associated memory 220, then the first and second access point 200, whose configuration information is fresher is designated as the Registrar 200-1. The relative freshness of the configuration information may be determined based on a comparison between configuration sequence numbers associated with each of the configuration information.

Alternatively, if none of the first and second access points 200 contain HyMN configuration information within their associated memory 220, then one or more of the first and second access points 200 may assign one of the first and second access points 200 as the Registrar 200-1 and the other one of the access points 200 as the Enrollee 200-1 based on various factors.

For example, the first and second access points 200 may determine that the access point 200 with the highest Media Access Control (MAC) address therebetween is the Registrar 200-1. Alternatively, if one of the first and second access points 200 is a gateway (GW) having direct access to an external network (e.g. the internet), then one or more of the first and second activated access points 200 may assign this access point 200 as the Registrar 200-1.

In operation 403, the Registrar 200-1 establishes connections with the Enrollee 200-2 to utilize in transmitting data used during the pairing procedure based on which ones of the interfaces 210 are utilized to connect the APs 200. If the Registrar 200-1 and the Enrollee 200-2 are connected via a wireless interface 210-1, the Registrar 200-1 may initiate a Wi-Fi Protected Setup (WPS) with the Enrollee 200-2. The WPS procedure may include a 4-way handshake to authenticate the Enrollee 200-1 to the Registrar 200-2 and derive a cryptographic key (Pairwise Transient Key) therebetween.

If the Registrar 200-1 and the Enrollee 200-2 are connected via a Power Line Communication (PLC) interface 210-2, the Registrar 200-1 may establish a secure PLC link with the Enrollee 200-2 via a User Key Exchange (UKE) procedure as defined by IEEE 1901. If the Registrar 200-1 and the Enrollee 200-2 are connected via an Ethernet Interface 210-3, the Registrar 200-1 and the Enrollee 200-2 may be able to directly communicate through their Ethernet interfaces 210-3. If the Registrar 200-1 and the enrollee 200-2 are connected via a Multimedia over Coax Alliance (MoCA) interface 210-4, the Registrar 200-1 may establish a secure link via an establishment procedure defined by MoCA standard v1.1 or v2.0.

A conventional network requires the setup of a "master" interface that facilitates the exchange of configuration parameters associated with various slave interfaces. The slave network formed by the pairing of the various slave interfaces, has a limited view of the network, therefore, a conventional network requires that the master interface be previously established prior to configuring secondary interfaces. Thus, in such a conventional network there is no connectivity between the APs when the master interfaces of each of the APs are not connected even if the slave interfaces are within the coverage of each other.

In contrast, in one or more example embodiments disclosed herein, each of the APs 200 contain machine executable code in the memory 220, that when executed by the processor 230, configures the processor 230 such that the configuration parameters for each of the interfaces 210 can be exchanged without connectivity on any other interface. Therefore, if the Registrar 200-1 and the Enrollee 200-2 are connectable via multiple ones of the interfaces 210, the setup of one of the interfaces 210 does not require connectivity in another one of the interfaces 210. Thus, there is no master-slave relationship among the various interfaces 210 and each AP 200 has a complete view of the HyMN network.

For example, an AP 200 with only a Wi-Fi interface 210-1 is aware of a PLC interface 210-2 of a neighboring AP 200 which has a Wi-Fi interface 210-1 and a PLC interface 210-2, thus, resulting in an increased number of routing alternatives within the HyMN network. Therefore, each interface 210 is capable of exchanging its own configuration parameters, and forming a mesh network without the need for previous establishment of a master interface. Thus, for example, an AP 200 with a wireless interface 210-1 and a PLC interface 210-2 can establish HyMN with an AP 200 that has only a wireless interface 210-1.

If the Registrar 200-1 and the Enrollee 200-2 are connected via multiple ones of the interfaces 210, the Registrar 200-1 and the Enrollee 200-2 may establish multiple secure separate links therebetween such that each link exchanges configuration parameters associated with one of the interfaces 210. Alternatively, one or more of the interfaces 210 can be utilized to distribute configuration parameters for other ones of the interfaces 210. For example, when the Registrar 200-1 and the Enrollee 200-2 pairing together over the wireless interface 210-1, in addition to exchanging configuration parameters associated with the wireless-interface 210-1 over the wireless medium 325, configuration parameters for other ones of the interfaces 210 can be also distributed over the wireless medium 325 via the wireless interfaces 210-1.

In operation 404, the Registrar 200-1 listens, via the receivers associated with each of its interfaces 210, for receipt of configuration request messages from the Enrollee 200-2 over the established connections. The configuration request messages may be probe messages that include a vendor specific extension.

In operation 405, upon receipt of the configuration request messages, the Registrar 200-1 transmits, via the transmitter associated with the interface 210 that received the configuration request message, a configuration instruction to the Enrollee 200-2. The configuration instruction may include a configuration parameter list that contains configuration information for the associated interface 210.

The configuration information included in the configuration parameter list may vary based on which ones of the interfaces 210 are utilized to transmit the configuration instruction.

For example, in an illustrative embodiment, if the wireless interface 210-1 is utilized, the configuration information includes: a Wi-Fi channel, a Service Set Identification (SSID) number, an encryption type and associated password, a PIN, a network ID associated with the HyMN network, and a configuration sequence number. If the PLC interface 210-2 is utilized, the configuration information includes: the Network ID associated with the HyMN network, a network membership key (NMK) and a configuration sequence number. If the Ethernet Interface 210-3 or the MoCA interface 210-4 are utilized, the configuration information includes: the Network ID associated with the HyMN network, a password and a configuration sequence number.

Additionally, while a connection over the wireless interface 210-1 may be initialized without the network membership key (NMK), a mesh flag and Quality of Services (QoS) parameters, the configuration information may include these additional parameters such that other ones of the interfaces 210 may be configured based on the configuration information exchanged over the wireless interface 210-1.

As illustrated above, for each of the interfaces 210, the configuration information may include a configuration sequence number (CSN) and a Network ID. The configuration sequence number CSN may indicate the relative freshness of an associated configuration parameter list. The Network ID may identify the HyMN network, and, therefore, may be the same Network ID irrespective of the interface 210.

Figure 5:
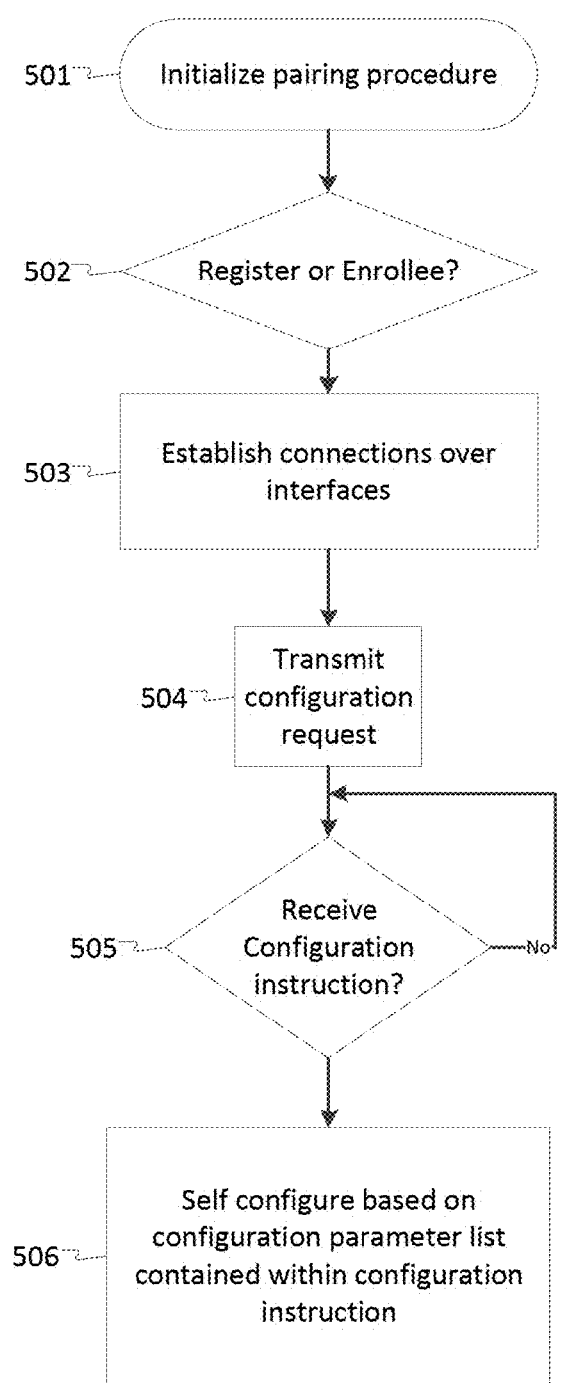
FIG. 5 illustrates a flow chart of an Enrollee executing a Hybrid Media Mesh Network Configuration method according to an example embodiment.

In operation 406, the Registrar authenticates an Enrollee 200-2 to join a HyMN network through the Registrar 200-2 if the Enrollee 200-2 is sufficiently self-configured based on the sent configuration parameter list FIG. 5 illustrates a flow chart of an Enrollee executing a Hybrid Media Mesh Network Configuration method according to an example embodiment.

Referring to FIGS. 1-3 and 5, in operations 501 and 502, the APs 200 initialize a pairing procedure and determine which one of the APs 200 will be the Registrar 200-1 and the Enrollee 200-2 as discussed above with reference to FIG. 4.

In operation 503, the Enrollee 200-2 establishes connections with the Registrar 200-1 to utilize in transmitting data used during the pairing procedure based on which ones of the interfaces 210 are utilized to connect the Access Points 200. The establishment of the connections between the Enrollee 200-2 and the Registrar 200-1 may be similar to those discussed above with reference to FIG. 5, therefore, for the sake of brevity, these procedures will not be repeated.

In operation 504, the Enrollee 200-2 transmits configuration request messages to the Registrar 200-1 over the established connections. The configuration request messages may be probe messages that include a vendor specific extension.

In operation 505, in response to the configuration request messages, the Enrollee 200-2 receives a configuration instruction from the Registrar 200-1. The configuration instruction may include a configuration parameter list that contains configuration information for the associated interface 210.

The configuration information included in the configuration parameter list may vary based on which ones of the interfaces 210 are utilized to transmit the configuration instruction. The details of what information may be included in the configuration instruction is the same as that discussed above with regard to FIG. 5, therefore, for the sake of brevity, these details will not be repeated.

In operation 506, using the configuration information contained in the received configuration parameter list, the Enrollee 200-2 performs a self-configuration procedure, in which it sets itself as a Registrar with up-to-date HyMN parameters, and joins the HyMN network. Thus, the APs 200 are self-organizing such that the Enrollee 200-2 joins the HyMN network without any oversight from a centralized controller.

Figure 6:
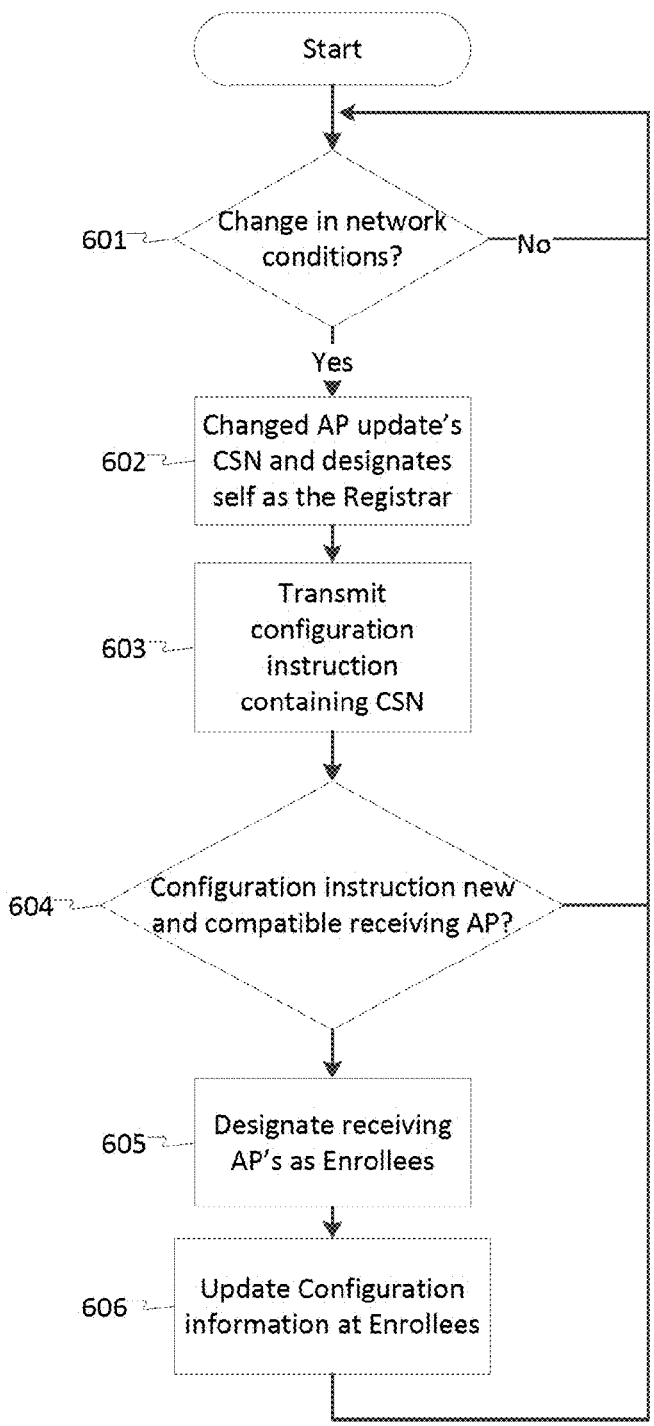
FIG. 6 illustrates a flow chart of an Enrollee executing a Hybrid Media Mesh Network Configuration Maintenance method according to an example embodiment.

FIG. 6 illustrates a flow chart of an Enrollee executing a Hybrid Media Mesh Network Configuration Maintenance method according to an example embodiment.

Referring to FIGS. 1-3 and 6, in operation 601, a HyMN network consisting of a plurality of APs 200 that each have a same configuration parameter list for their associated interfaces 210, may experience a change in network conditions. For example, one of the APs 200 may experience a change in their associated configuration information.

In operation 602, the AP 200 experiencing a change in their associated configuration information updates the configuration sequence number CSN associated with its configuration parameter list and designate themselves as a Registrar 200-1. In one example embodiment, the configuration sequence number CSN may be updated by incrementing the configuration sequence number CSN.

In operation 603, the Registrar 200-1 transmits a configuration instruction to other APs 200 in the HyMN network, the configuration instruction may include at least the updated configuration sequence number. The Registrar 200-1 sends the configuration instruction to the other APs 200 using all of its available interfaces 210 other than any interface 210 which may be temporarily unlinked from the HyMN network due to the change in the network conditions. For example, if a Wi-Fi channel is changed at the Registrar 200-1, this information can be carried to the other APs 200 via the interfaces 210 available at the Registrar other than the wireless interface 210-1.

In operation 604, each of the APs 200 that receive the configuration instruction determines whether the configuration information associated with the configuration instruction is fresher than the configuration information stored in the memory 220 of the associated AP 200. Additionally, APs 200 that do not receive the configuration instruction due being disconnected from the HyMN network while the configuration instruction is propagated therethrough, execute a Hybrid Media Mesh Network Configuration method as discussed above with regard to FIG. 6 upon joining the HyMN network to receive the freshest configuration information.

The relative freshness of the configuration information may be determined based on a comparison between configuration sequence numbers associated with each of the configuration information.

In one or more example embodiments, the configuration instruction further includes a manufacturer code associated with the interface 210 of the Registrar 200-1 and/or a Network ID that identifies the HyMN network of the Registrar 200-1. In an illustrative embodiment, the APs 200 that receive the configuration instruction determine whether the manufacturing code associated with the configuration instruction and the manufacturing code of the interface of the receiving AP 200 are compatible. Likewise, the APs 200 that receive the configuration instruction determine whether the Network ID associated with the configuration instruction matches a Network ID of the HyMN network in which the receiving AP 200 is enrolled.

In operation 605, if the receiving APs 200 determine that the configuration instruction is compatible therewith and that the configuration information associated with the configuration instruction is fresher than the configuration information stored therein, the receiving APs 200 are designated as Enrollees 200-2 and proceed to operation 606. Alternatively, if the received configuration information is not fresher than the stored configuration information or the received configuration information is not compatible therewith, the receiving APs 200 may discard the received configuration instruction.

In operation 606, each of APs 200 designated as the Enrollees 200-2 update their associated configuration information.

To update their associated configuration information, the Enrollees 200-2 may request a configuration parameter list containing further configuration information from the Registrar 200-2. The Enrollees 200-2 may request the configuration parameter list from the Registrar 200-1 via configuration request messages. In response, to the configuration request messages, the Registrar 200-1 may send another configuration instruction that includes a configuration parameter list. The transmission of the configuration request message and the configuration instruction including the configuration parameter list may be similar to that discussed above with regard to FIGS. 5 and 6, and, therefore, for the sake of brevity the details of the transmission will not be repeated.

Alternatively, the original configuration instruction may include the entire configuration parameter list, therefore, the Enrollees 200-2 may update their associated configuration information without request the configuration parameter list.

Routing within an Established HyMN Network

Figure 7:
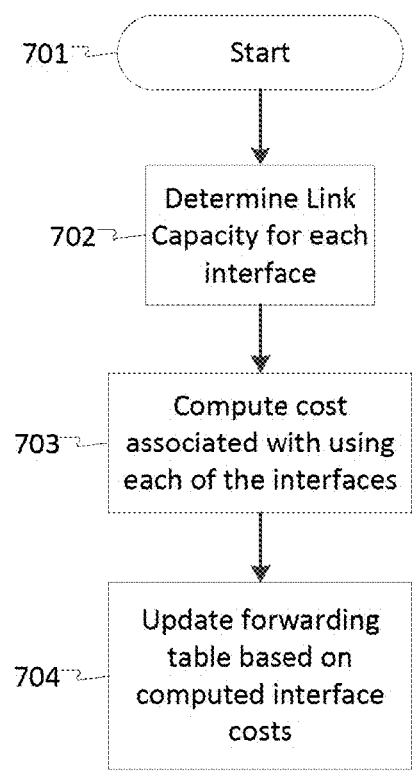
FIG. 7 illustrates an example of an Access Point (AP) estimating a cost of using interfaces associated therewith according to an example embodiment.

FIG. 7 illustrates an example of an Access Point (AP) estimating a cost of using their associated interfaces according to an example embodiment.

Referring to FIG. 7, after the APs 200 are interconnected in the HyMN network, each of the APs 200 establish an estimate of the cost of using each of its interfaces 210 to forward data traffic. The cost of using an interface 210 may be the estimated duration for which a communication medium associated with the interface 210 will be used. For example, the estimated duration that the Ethernet line 315, the power line 320, and/or the air medium 325 are utilized. The estimated duration of use of the medium may be inversely proportional to the bandwidth and/or capacity of the medium.

In operation 710, each of the APs 200 determine a link capacity of each for their interfaces 210.

The link capacity may be expressed in terms of bits per second (bps). The link capacity may be determined by the driver of each of the interfaces 210 of the APs 200 at the Physical Layer (Layer 1). The interfaces 210 provide the estimated link capacity and an associated Medium Access Controller (MAC) address of the interfaces 210 to the HyMN Forwarding Layer (HyMN-FL). This estimate of the link capacity is distributed from the HyMN Forwarding Layer (HyMN-FL) to the HyMN Metric Layer (HyMN-ML) such that the HyMN Metric Layer (HyMN-ML) of an AP 200 obtains an estimate of the link capacity over each of the interfaces 210 available at the AP 200.

For the wireless interface 210-1, the AP 200 may estimate the link capacity based on a Signal to Noise ratio (SNR) and/or a Received Signal Strength Indicator (RSSI). Using the SNR or RSSI, the AP 200 may determine a highest possible spectral efficiency and an associated Modulation and Coding Scheme (MCS) Index Value that may be utilized with the quality of the signal at the wireless interface 210-1. Further, rather than using an instantaneous value of the MCS Index associated with a particular packet in time, the AP 200 may maintain a moving average of the MCS Index to obtain link estimate that is less susceptible to spikes in network noise. Additionally, the estimate of the link capacity may take into account an aggregate equate size, traffic load, etc.

For the PLC interface 210-2 and/or the MoCA interface 210-4, the AP 200 may estimate the link capacity through a tone map reported by the respective physical layer PHY of the interface 210.

Alternatively, rather than estimating the link capacity, the APs 200 may determine the link capacity by transmitting control messages to facilitate packet dispersion techniques, over each of the interfaces to their respective one-hop neighboring APs 200.

In operation 720, the APs 200 use the link capacity determined for each of their interfaces 210 to compute the interface cost of using the associated interface 210.

The APs 200 may compute the cost of using an interface based on a function that varies based on the link capacity. For example, the APs 200 may compute the cost of an interface 210 as:

$$\text{Cost of an interface} = 1/\text{Capacity of the Interface} \qquad \text{Eq. (1)}$$

In operation 730, the APs 200 update their associated forwarding table based on the computed interface costs.

FIG. 8 illustrates a forwarding table according to an example embodiment.

Referring to FIG. 8, the forwarding table may include:
- a destination identification (Dest ID) field identifying one of the other APs 200 as a possible destination AP 200-D in the HyMN network. For example, the Dest ID may represent the MAC address of the destination APs 200-D;
- a source identification (Src. ID) identifying the AP 200 that generated the route request that caused the Destination ID to be entered within the forwarding table;
- a next hop ID (Next Hop ID) identifying a Neighboring AP 200 to utilize when forwarding packets downstream to the destination AP 200-D;
- a next hop interface (Next Hop Int.) identifying an interface 220 to utilize when forwarding packets to the destination AP 200-D, this value may be dynamically updated based on a received route reply (RREP) message, as discussed in more detail below;
- a previous hop ID (Prev. Hop ID) identifying a one-hop neighboring AP 200 to utilize when forwarding packets upstream to a source AP 200-D, this value may be updated based on a received route request message (RREQ) message, as discussed in more detail below;
- a previous hop interface (Prev. Hop Int.) identifying an interface 220 to utilize when forwarding packets upstream to the source AP 200-S, this value may be updated based on a received route request message (RREQ) message, as discussed in more detail below;
- a source sequence number (SSN) identifying the freshness of the information contained within the forwarding table for the downstream path to the destination AP 200-D indicated in the Dest. ID;
- a destination sequence number (DSN) identifying the freshness of the information contained with the forwarding table for the upstream path to the source AP 200-S indicated in the Src. ID;
- a cost (Cost) from source AP 200-S to the AP 200, the cost indicating the aggregate cost along a route of selected interfaces 220 between the AP 200 associated with the forwarding table and the source AP 200-S, this value may be updated based on the received route reply message (RREP), as discussed in more detail below;
- an idle timer (Idle Timer) may optionally be included that may be set to zero each time the respective entry is used. When the idle timer reaches to a predetermined value, indicating that the respective route has not been used for a desired (or alternatively, a predetermined) amount of time, and, therefore the idle timer may be stale, the respective entries in the table are cleared;

a timestamp indicating when the entry for the Dest. ID was last updated.

However, while the forwarding table illustrated in FIG. 8 includes the above mentioned fields, example embodiments are not limited thereto, and the forwarding table may be configured to embody various forms.

Figure 9:
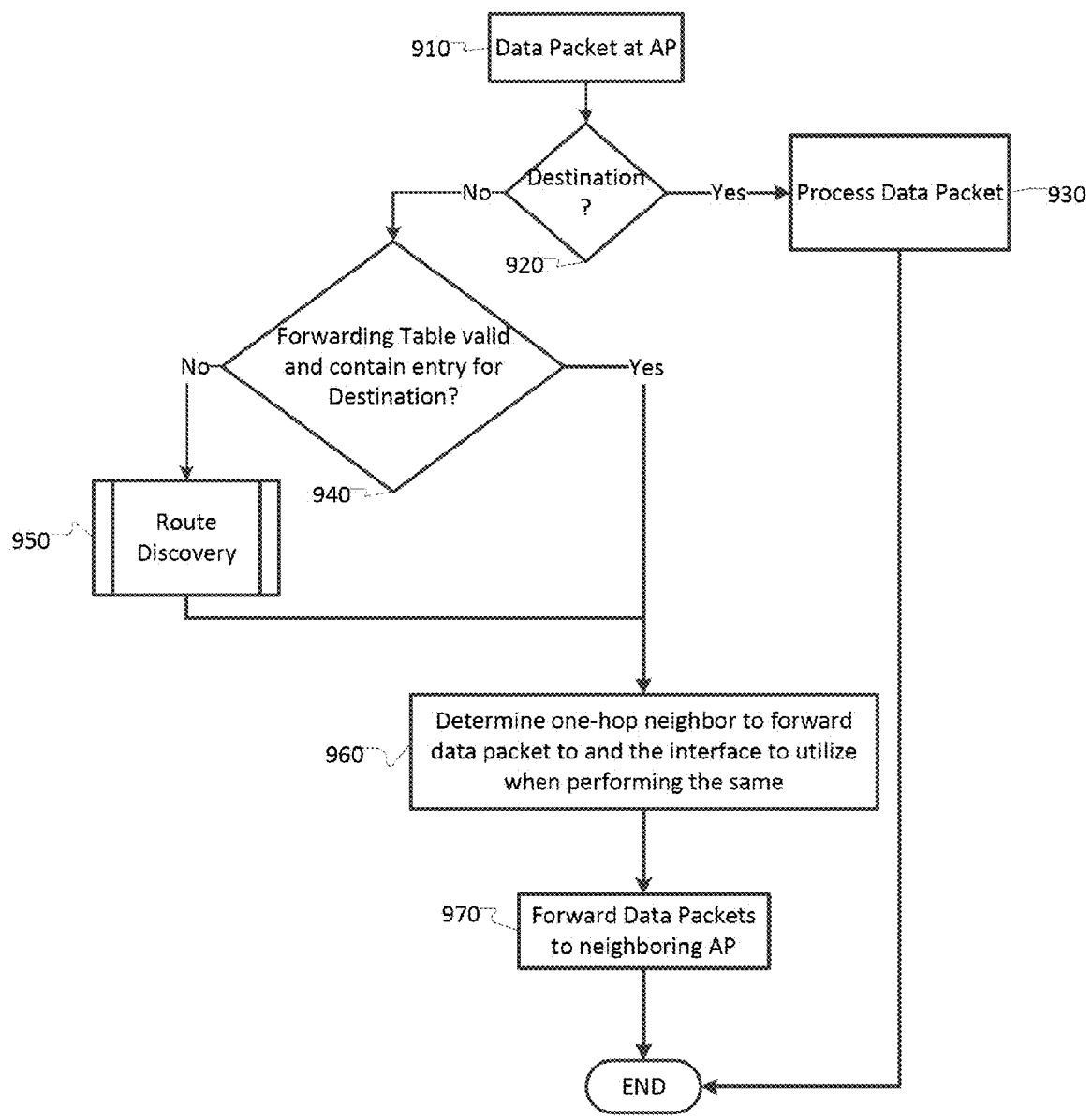
FIG. 9 illustrates an example of an Access Point (AP) routing a data packet within a Hybrid Media Mesh Network (HyMN) according to an example embodiment.

FIG. 9 illustrates an example of an Access Point (AP) routing a data packet within a Hybrid Media Mesh Network (HyMN) according to an example embodiment.

Referring to FIGS. 1-3, 8 and 9, in operation 910 an AP 200 may have a data packet held within a queue therein. For example, the data packet may be within the memory 220 of the AP 200.

In operation 920, the AP 200 determines whether the AP 200 having the data packet within its memory 200 is a destination AP 200-D of the data packet. For example, the AP 200 may be the destination AP 200-D if a header of the data packet indicates that the data packet is designed to a UE 100 serviced by the AP 200.

If the AP 200 determines that it is the destination AP 200-D for the data packet, then in operation 930 the AP 200-D processes the data packet. For example, the AP 200-D may forward the data packet to the end user UE 100 connected thereto based on information in the processed header.

If the AP 200 determines that it is not the destination AP 200-D for the data packet, and instead is an intermediary, in operation 940, the non-destination AP 200-ND determines whether a forwarding table stored in the memory 220 therein contains a non-expired entry for the destination AP 200-D.

The AP 200 may determine whether the forwarding table is expired by determining whether an elapsed time since the timestamp field (Time Stamp) associated with the entry for the destination AP 200-D is greater than a route freshness duration threshold. The route freshness duration threshold may be set by an operator of the HyMN network.

If the non-destination AP 200-ND determines that its forwarding table is expired or that there is no entry therein for the destination AP 200-D, in operation 950, the AP 200-ND initiates a route discovery procedure to update the forwarding table stored therein to utilize in determining an appropriate route to the destination AP 200-D. The route discovery procedure will be discussed in detail below with reference to FIG. 10.

In operation 960, the AP 200-ND determines using the forwarding table, which (i) one of the AP's 200-ND one-hop neighboring APs 200 to forward the data packet to and (ii) interface to utilize when sending the data packet to the determined one-hop neighboring AP 200. The AP 200-ND may also reset the idle timer within the forwarding table associated with the destination AP 200-D.

In operation 970, the non-destination AP 200-ND forwards the data packets to the one-hop neighboring AP 200 interface 210 combination determined in operation 950. Thus, the non-destination AP 200-ND may perform the route discovery procedure to determine the route to the destination AP 200-D without any oversight from a centralized controller.

The non-destination AP 200-ND may continue to forward data packets to the destination AP 200-D using the one-hop neighboring AP 200 and interface 210 combination determined in operation 950 until the Time Stamp (TimeStamp) in the forwarding table indicates that entry for the destination AP 200-D is expired.

In accordance with a further specific embodiment disclosed herein, each of the APs 200 are able to prioritize the data packets, such that incoming data packets may be forwarded out of order. For example, each of the APs 200 can differentiate between levels of services provided to different providers such that certain provider's data packets are processed ahead of other data packets within the memory queue 220.

In one or more example embodiments, the APs 200 set a priority level of a particular data packet. In one illustrative embodiment, the priority level indicates a Quality of Service (QoS) associated with the data packet.

In one illustrative embodiment, the APs 200 contain computer executable code, that when executed by the processor 230, configures the processor 230 to process data packets within a queue in an order determined based on the priority level associated with the data packet.

In another illustrative embodiment, the priority level may provide different providers with access to different ones of the interfaces 210 such that certain provider's content may only be routed along a particular interface 210 while other provider's content may be routed along various interfaces 210 along the route from the sources AP 200-S to the destination AP 200-D. Due to the prioritization provided by the APs in the HyMN network, the packets associated with the prioritized APs 200, may experience a relatively high end-to-end throughput and low end-to-end jitter. Therefore, by providing processing priority and/or access to a particular interface 210 based on the access provider associated with the data, the HyMN network may encourage subscribers to utilize the prioritized data provider.

For example, if UE 100 that originated the data packet is a set-top box (STB), then the computer executable code in the AP 200, when executed, configures the processor 230 to classify the data packet as video. Alternatively, if the UE 100 that originated the data packet is not a set-top box (STB), the processor 230 of the AP 200 may classify the data packet as not video.

In an illustrative embodiment, the processor 230 may classify the data packet by setting an indicator in one or more of the header or payload of the data packet that indicates whether the data packet is associated with a prioritized data provider. The APs 200 in the HyMN network utilize different methods to classify the priority information of the data packets based on which one of the interfaces 210 are utilized to forward the data packets. For example, data packets transmitted over the wireless interface 210-1 may utilize an Enhanced Distributed Channel Access" (EDCA) indicator in the header of the data packet as defined by IEEE 802.11e. Further, the Ethernet interface 210-3 may utilize an indicator as defined by IEEE 802.1Q. Likewise, the MoCA interface 210-4 may utilize an indicator defined by Homeplug AV 2.0 which allows for four levels of priority access tagging. By utilizing methods compatible with the standards for the associated interface 210, the HyMN network does not need to define a new set of packet classifiers, but instead can utilize available QoS tags of the respective interfaces. Therefore, the HyMN network can be interconnected with devices that do not have HyMN capability while still allowing prioritization of data packets.

In another example embodiment, the data packet may arrive at the AP 200 such that the data packet contains an indication that the data packet is associated with the prioritized data provider. Therefore, the computer executable code in the AP 200, when executed, configures the processor 230 to determine if the data packet is associated with the prioritized data provider by reading the data packet and prioritizing the data packet based on a result of the determination. The AP 200 may read one or more of the header of the data packet and data contained within the payload of the data packet.

In another example embodiment, rather than receiving a data packet having a priority indication therein, the computer executable code configures the processor 230 to differentiate between the prioritized data provider and other data providers. For example, the AP 200 may determine the data provider for which the data packet originated and prioritize the data packet based on a result of the determination. For example, the computer executable code may configure the processor 230 to insert an indicator in one or more of the header or payload of the data packet that indicates whether the data packet is associated with the prioritized data provider or the other data providers.

Thus, in operation 970, the AP 200-ND in the HyMN Network may determine an optimal combination of an interface 210 and a neighboring AP 200 for a particular destination AP 200-D and continue to use that combination until the combination may no longer be optimal due to changed network conditions. The determination may be based both on the route within the routing table and a priority level of the data packet.

Figure 10:
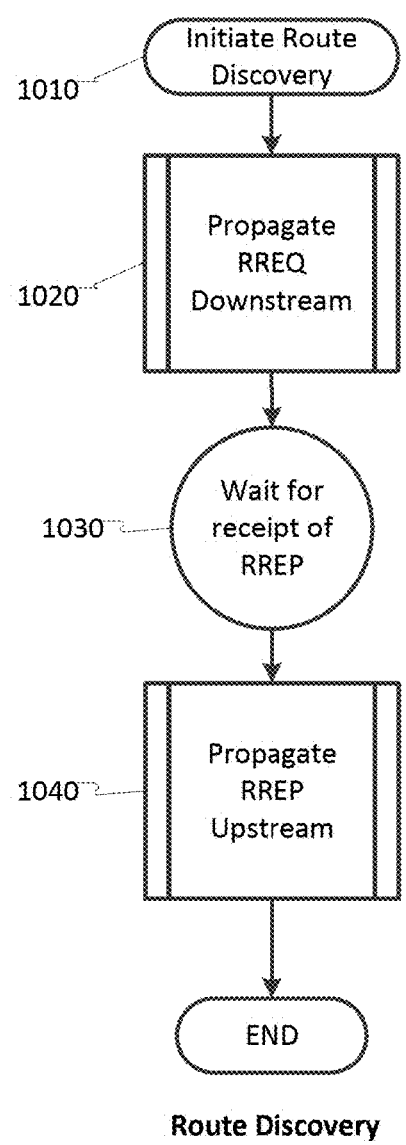
FIG. 10 illustrates an example of a non-destination Access Point (AP) performing a route discovery method using a forwarding table according to an example embodiment.

FIG. 10 illustrates an example of a non-destination Access Point (AP) performing a route discovery method using a forwarding table according to an example embodiment.

Referring to FIG. 10, in operation 1010 a non-destination AP 200-ND initiates a route discovery method if the AP 200 is holding a data packet destined to a destination AP 200-D and there is no valid entry in a forwarding table thereat for the destination APs 200. The non-destination AP 200-ND may be a source AP-S 200 that generated the data packets or is an intermediary that is forwarding the data packets from the source AP 200-S to the destination AP 200-D.

In operation 1020, the AP 200-ND initiates a Propagate Route Request (RREQ) downstream procedure to propagate a Route Request message (RREQ) to each of its one-hop neighbors. The Propagate Route Request procedure will be discussed in detail below with reference to FIG. 11.

In operation 1030, the AP 200-ND waits for receipt of a Route Response message (RREP) generated by the destination AP 200-D in response to the Route Request message (RREP). The Route Response Message (RREP) will be discussed in detail below with reference to FIG. 13.

Further in operation 1030, if an entry for the destination AP 200-D exists but the forwarding table is expired, in addition to waiting for receipt of the RREP message, to decrease a size of a data quote and an associated delay, the non-destination AP 200-ND may forward the data packet to one of its neighboring APs 200 using the forwarding information contained within the expired forwarding table.

In operation 1040, in response to a received RREP message, the AP 200-ND initiates a Propagate Route Response (RREP) upstream procedure to propagate a Route Response message (RREP) back to the source AP 200. The Propagate Route Response (RREP) upstream procedure will be discussed in detail below with reference to FIG. 13.

Figure 11:
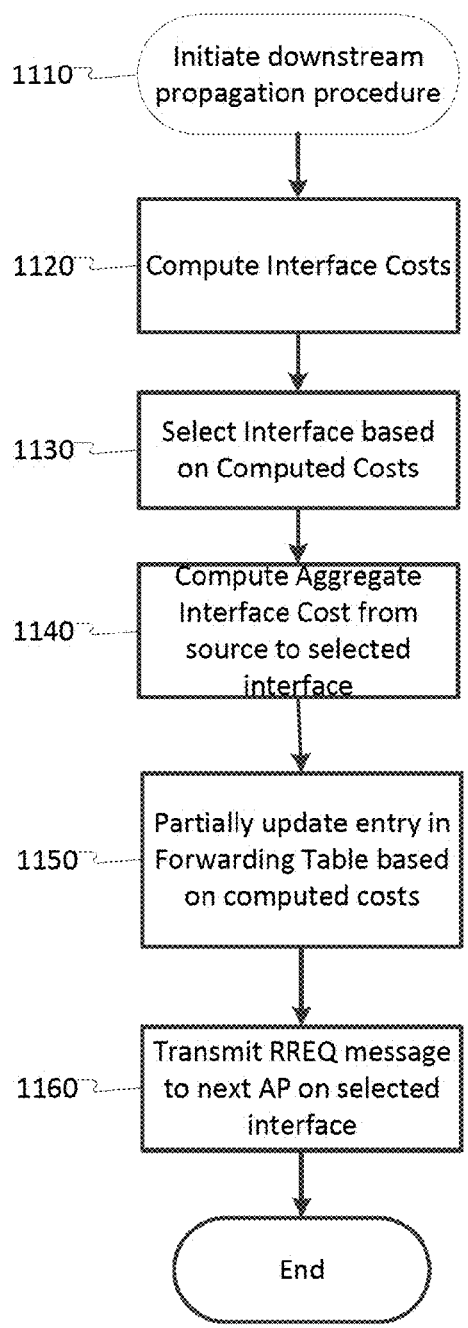
FIG. 11 illustrates an example of an Access Point (AP) performing a procedure to propagate a route request according to an example embodiment.

FIG. 11 illustrates an example of an Access Point (AP) performing a procedure to propagate a route request according to an example embodiment.

Referring to FIG. 11, in operation 1110, a non-destination AP 200-ND initiates a route Propagate Route Request procedure if the AP 200 is holding a data packet destined to a destination AP 200-D and the non-destination AP's 200-ND forwarding table does not contain a valid entry for the destination AP 200.

In operation 1120, the non-destination AP 200-ND computes the interface costs for communicating with each of the non-destination AP's 200-ND one-hop neighboring APs 200 over each of the non-destination AP's 200-ND associated interfaces 210. The non-destination AP 200-ND may compute the interface costs using the method discussed with regard to FIG. 7, therefore for the sake of brevity discussion of the computation of the interface cost will not be repeated.

In operation 1130, for each one hop neighboring AP 200, the non-destination AP 200-ND determines an interface 210 to utilize in communication between the AP 200 and its one-hop neighbors 200-N using the interface costs computed in operation 1120. For example, for each neighboring AP 200, the non-destination AP-ND 200 may determine the interface 210 by selecting an interface shared therebetween having a minimum interface cost associated therewith.

In operation 1140, the non-destination AP 200-ND computes an aggregate cost of transmission downstream from the source AP 200-S to the non-destination AP 200-ND over the interfaces 210 chosen along the route.

The AP 200-ND may determine the aggregate interface cost for transmitting over a route i consisting of a particular set of APs 200 as a function of the costs incurred on a medium, known as a "collision domain", that is used along the route i. The total cost from the source AP 200-S to the destination AP 200-D along a particular collision domain varies based on whether the medium is a shared-medium or an unshared-medium.

In a shared-medium, each interface 220 in the HyMN network may need to exclusively use the medium for the duration of their transmission, therefore, the total transmission cost along the route i using a shared-medium may be calculated by aggregating the costs at each interface 220 along the route via a function +' that substitutes the straight-forward addition.

In contrast, in an unshared-medium, the interfaces 220 may not interfere with each other, therefore, the total transmission cost along a route i using an unshared-medium may be calculated by a max( ) operation that determines the total cost for that collision domain based on which one of the interfaces 220 along the route has the highest cost, since the interface 220 with the highest individual cost may bottleneck the route.

Once the total cost from the source AP 220-S to the destination AP 200-D is calculated for each collision domain, the AP 200 performs a read' operation to determine the cost $C_{S,D}(i)$ of a selected route i between the source AP 200-S and the destination 200-D out of M different total costs.

$$C_{S,D}(i) = \text{read}' \begin{pmatrix} \text{total cost from } S \text{ to } D \text{ in collision domain 1} \\ \text{total cost from } S \text{ to } D \text{ in collision domain 2} \\ \vdots \\ \text{total cost from } S \text{ to } D \text{ in collision domain } M \end{pmatrix} \quad \text{Eq. (2)}$$

In one embodiment, the read' operation performed by the AP 200 in Equation (2) may be the max( ) operation such that the cost function provides the maximum cost out of the M different total costs incurred in different communication medium used along the route between the source AP 200-S and the destination AP 200-D.

In operation 1150, the AP 200 creates or partially updates an entry for the destination AP 200-D in its associated forwarding table. The partial updating of the forwarding table entry for the destination AP 200-D may include updating the Dest. ID, Src. ID, SSN, cost, idle timer and timestamp associated with the entry for the destination AP 200-D.

In operation 1160, the AP 200 transmits a Route Request (RREQ) message to each of its one-hop neighbors over the selected interface 210 shared therebetween. The RREQ message may be transmitted via a unicast transmission such that the RREQ message is sent directly to the MAC address of the selected interface 210. The RREQ message, in addition to the next hop address, and next hop interface address to be utilized for unicast transmission, may contain:

The Destination ID (Dest ID);
The Source ID (Src. ID);
The next hop ID (Next Hop ID);
The next hop interface (Next Hop Int.);
The Source Sequence Number (SSN);
The aggregate running cost (Cost) of the route from the AP 200 sending the RREQ message upstream to the source AP 200-S (Cost), as calculated in operation 1140; and
The timestamp indicating when the information associated Dest ID was updated.

Initially, the Cost value included in the RREQ message generated by the source AP 200-S may be zero. Each AP 200 along the route may replace the Cost value with the value calculated in operation 1140. As such, during the discovery of the route from the source AP 200-S to the destination AP 200-D, the cost estimate included in the RREQ message may be updated as the RREQ message is propagated along the route from the source AP 200-S to the destination AP 200-D. As the RREQ message propagates, each intermediate AP 200 along the route may determine which one of their multiple interfaces 210 to utilize to send the packet further downstream using the cost estimate included in the RREQ message. Because the cost estimate is dynamically updated along the route to represent the running cost of the route from the source AP 200-S to the intermediate AP 200, the intermediate AP 200 may utilize the running cost and the costs associated with the intermediate AP's 200 interfaces 210 that utilize different collision domains to determine a most efficient next-hop AP 200 on the path from the source AP 200-S to the destination AP 200-D. By choosing an efficient combination of APs 200 and associated interfaces 210 that utilize a particular collision domain (medium), data throughput may be increased. Thus, the User Equipments (UEs) 100 serviced by a particular access point AP 200 in the HyMN network may be provided with greater access to resources from the HyMN network. For example, a UE 100 may be able to access multiple sources of data simultaneously, such as a satellite feed from the satellite link 305, an internet feed from the internet link 300 and a time-shifted video feed from one of the APs 200 acting as a digital video recorder (DVR).

The transmitted RREQ message may be unicast directly to the selected interface 210 of the neighboring AP 200. For example, the transmitted RREQ message may be unicast directly the MAC address of the neighboring AP. Because the MAC address may be used to identify the neighboring AP 200, the AP 200 need not resolve the MAC address of each interface 210 to an associated IP address. Therefore, the AP 200 may require less processing overhead to transmit the RREQ message.

Figure 12:
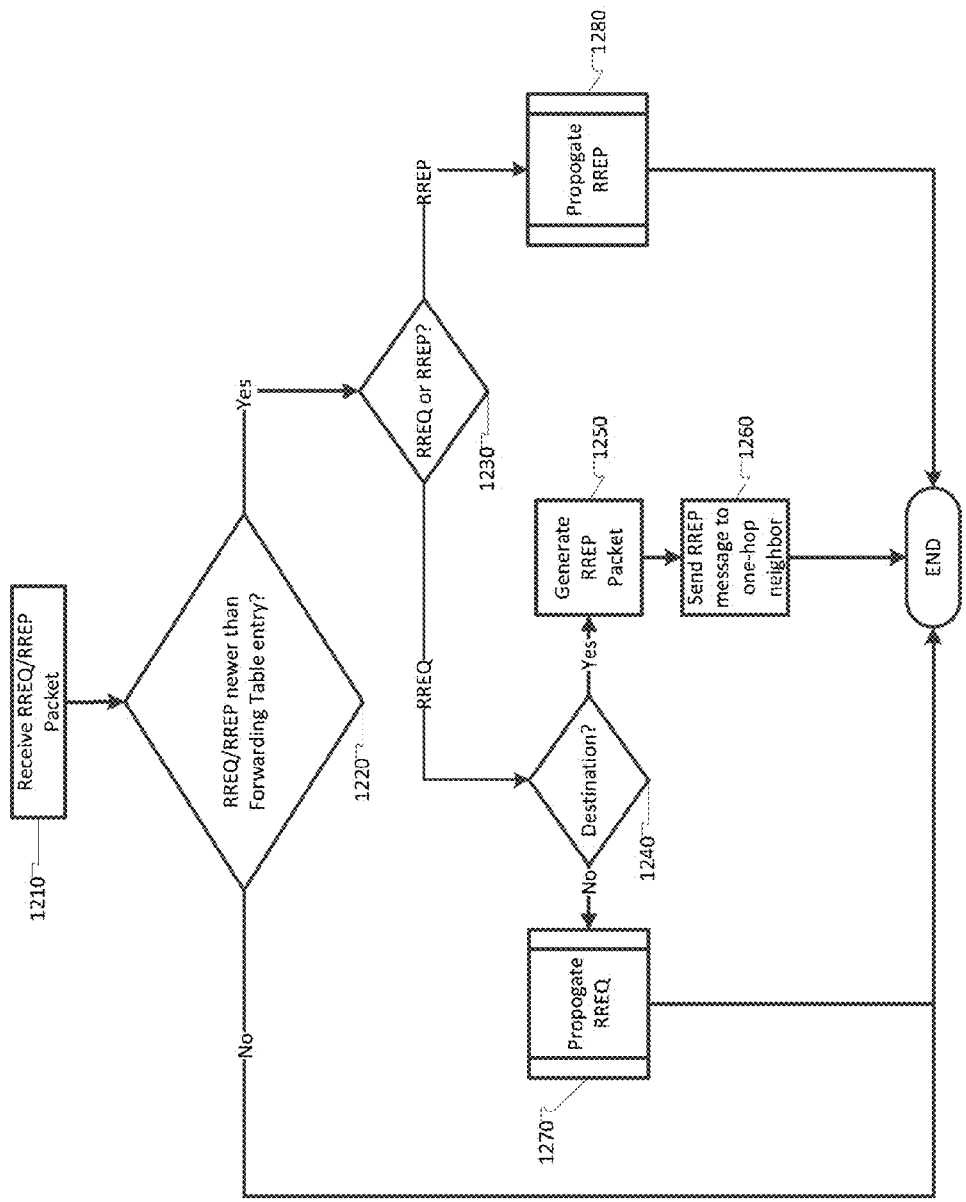
FIG. 12 illustrates a intermediate or destination Access Point (AP) receiving a Route Request message according to an example embodiment.

FIG. 12 illustrates an intermediate or destination AP receiving a Routing message according to an example embodiment.

Referring to FIG. 12, in operation 1210, an AP 200 receives a Routing Message from another AP 200 in the HyMN network. The Routing message is Route Request (RREQ) from an upstream AP 200 or a Route Reply (RREP) message from a downstream AP 200 within the HyMN network. For example, the intermediate AP 200 may receive the Routing Message RREQ, RREP message via one or more of its associated interfaces 210 from one of the APs 200 in the HyMN network.

In operation 1220, the AP 200 receiving the Routing Message RREQ, RREP determines whether the forwarding information contained within the Routing Message RREQ, RREP is newer than the forwarding information within its forwarding table.

The AP 200 may first determine whether its forwarding table is expired by determining whether an elapsed time since the timestamp field (Time Stamp) associated with the entry for the destination AP 200-D is greater than the route freshness duration threshold. If the forwarding table is expired, then the AP 200 may determine that the forwarding information contained within the Routing Message RREQ, RREP is fresher than the forwarding information.

Further, even if AP 200 determines that its forwarding table is unexpired, for a Route Request message RREQ, the AP 200 may determine if the Source Sequence Number (SSN) contained in the RREQ message indicates that the forwarding information contained within the RREQ message is fresher than the forwarding information stored in the memory 220 of the AP 200. The relative freshness of the forwarding information may be determined based on a comparison between the SSN of the RREQ message and the SSN stored within the forwarding table of the AP 200. Likewise, for a Route Reply message, the AP 200 may determine if the Destination Source Number (DSN) contained in the RREP message indicates that the forwarding information contained within the RREP message is fresher than the forwarding information stored in the memory 220 of the AP 200. The relative freshness of the forwarding information may be determined based on a comparison between the DSN of the RREP message and the DSN stored within the forwarding table of the AP 200.

If the information contained in the Routing Message RREQ, RREP is not newer than the information within a non-expired forwarding table, then the AP 200 may not propagate the received Routing Message RREQ, RREP further in the HyMN network.

If the information is newer than the information stored within the forwarding table or the forwarding table is expired, then in operation 1230, the AP 200 may determine whether the Routing Message RREQ, RREP is the Route Request RREQ or the Route Reply RREP.

If the received Routing Message RREQ, RREP is the Route Request RREQ, then in operation 1240 the AP 200 receiving the Route Request RREQ determines whether it is the destination for the original data packet that caused the generation of the RREQ message based on information stored within the RREQ message.

If the AP 200 determines that it is a destination AP 200-D for the RREQ message, and, thus the original data packet, in operation 1250, the destination AP 200-D generates the Route Reply RREP message. The RREP message, in addition to the next hop address, and next hop interface address to be utilized for unicast transmission, may include the following fields: Dest. ID, Src. ID, DSN, COST indicating the aggregate cost from the sender of the RREP to the destination, timestamp.

In operation 1260, the destination AP 200-D transmits the generated RREP message back upstream to one of its one-hop neighboring APs 200 over one if its interfaces 210.

The destination AP 200-D may select the neighboring AP 200 and the interface 210 based on the previous hop id (Prev. Hop ID) and previous hop interface (Prev. Hop Int) indicated in the forwarding table entry (Src. ID) associated with the source AP 200-S. Thus, the neighboring AP 200 and the interface 210 may be selected based on which interface 210 and neighboring AP 200 therefrom the destination AP 200-D received the corresponding RREQ message. For example, the destination AP 200-D may select the same interface 210 and neighboring AP 200 that it received the corresponding RREQ message from to transmit the RREP message to.

The transmitted RREP message may be unicast directly to the interface 210 of the neighboring AP 200 using the information in the forwarding table. For example, the MAC address of the neighboring AP. Thus, because the MAC addresses may be used to identify the neighboring AP 200, the AP 200 may not need to resolve the MAC address of each interface 210 to an associated IP address, resulting in a decrease in processing overhead.

If the AP 200 determines that it is not a destination for the RREQ message, and, thus the original data packet, in operation 1270, the AP 200 initiates the Propagate Route Request (RREQ) downstream procedure to forward the RREQ message further downstream. The Propagate Route Request (RREQ) downstream procedure may be the same procedure that was discussed above with reference to FIG. 11. Therefore, for the sake of brevity repeated description thereof will be omitted.

In contrast, if the AP 200 determines that the received message is the Route Reply RREP message and not the Route Request RREP message, then in operation 1280 the AP 200 initiates the Propagate Route Response (RREP) upstream procedure to propagate a Route Response message (RREP) back to the source AP 200.

Figure 13:
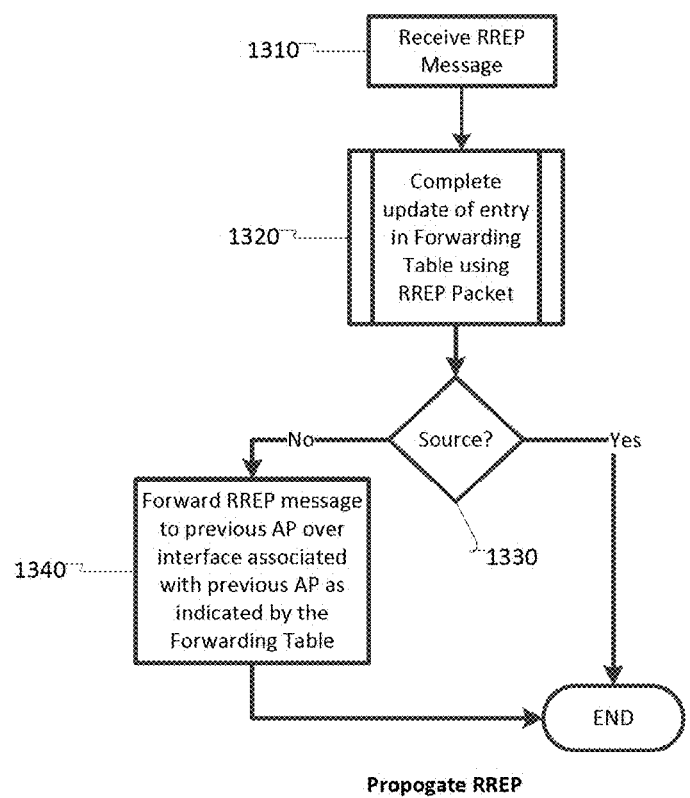
FIG. 13 illustrates an example of an Access Point (AP) performing a Propagate Route Response (RREP) procedure according to an example embodiment.

FIG. 13 illustrates an example of an Access Point (AP) performing a Propagate Route Response (RREP) procedure according to an example embodiment.

Referring to FIG. 13, in operation 1310, an AP 200 may receive a Route Reply RREP message that is determined to have newer information than a corresponding entry in a forwarding table at the AP.

In operation 1320, the AP 200 updates its forwarding table based on the newer information contained within the received RREP message. The AP 200 may update the forwarding table by completing the incomplete entry for the destination 200-D by updating:

The "Next Hop" information with the MAC address of the neighboring AP 200-N from which the AP 200 received the RREP message from;

The "Next Hop Interface" information with the interface 210 from which the AP 200 received the RREP message;

The interface Cost, Source Sequence Number (SSN), and Destination Sequence Number (DSN) with values thereof extracted from the RREP message; and The timestamp of the forwarding table to the time the RREP message was received.

In operation 1330, the AP 200 determines if it is the source AP 200-S that originally sent the Route Request RREQ message in response to data within a queue thereat.

If the AP 200 determines that it is the source AP 200-S, then the route discovery procedure illustrated in FIG. 10 terminates and the data packet is be sent by the source AP 200-S using the completed forwarding table as discussed above with reference to FIG. 9.

In operation 1340, if the AP 200 is not the source AP 200-S, the AP 200 forwards the RREP message further upstream towards the source AP 200-S. The RREP message may be sent upstream towards the source AP 200-S following the same route of APs 200 and interfaces 210 as utilized to send the associated route request RREQ message. Therefore, each one of the APs 200 along the route from the source AP 200-S and the destination AP 200-D may complete their associated forwarding table in response to the received RREP message.

Figure 14:
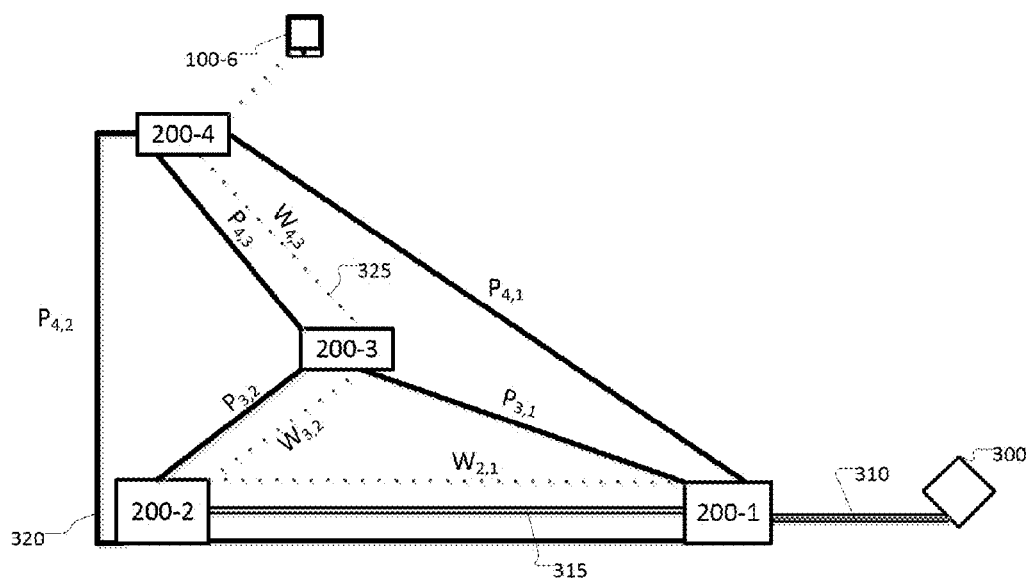
FIG. 14 illustrates an example of forwarding data within a Hybrid Media Mesh Network (HyMN) according to an example embodiment.

FIG. 14 illustrates an example of forwarding data within a Hybrid Media Mesh Network (HyMN) according to an example embodiment.

FIG. 15 illustrates an example of a forwarding table generated during the forwarding of data within a Hybrid Media Mesh Network (HyMN) according to an example embodiment.

Referring to FIGS. 9-15, in FIG. 14, the UE 100-6, serviced by AP 200-4, wishes to upload data to a web server on the Internet 300 and sends appropriate data packets to the AP 200-4.

If AP 200-1 does not have an entry in its Forwarding Table for destination 200-4, AP 200-1 initiates route discovery. Node 200-1 unicasts a RREQ to each of its neighbors, which, according to FIG. 14, are AP 200-3, 200-2, and 200-1. For each neighbor, node 200-1 estimates the cost of transmitting over each interface 210 shared with this neighbor. For example, AP 200-1's cost estimates for transmitting to AP 200-3, over its wireless interface 210-1 and PLC interface 210-2 are:

$$\begin{pmatrix} w_{111,109} \\ undef \\ undef \end{pmatrix} \text{ and } \begin{pmatrix} undef \\ p_{111,109} \\ undef \end{pmatrix}, \text{ respectively.}$$

AP 200-4 may compare the costs of transmitting to AP 200-3 along the identified interfaces to node 109. If the Wireless interface 210-1's associated cost $W_{4,3}$ is less than the PLC interface 210-2's associated cost $P_{4,3}$, AP 200-4 sends its RREQ to neighbor 200-3 only over the Wi-Fi interface 210-1; if the opposite holds, AP 200-4 may 200-1 send its RREQ over the PLC interface 210-2. The RREQ message may include the source ID (200-1), destination ID (200-4), an up-to-date SSN and its estimated cost of using the selected interface, namely:

$$\begin{pmatrix} undef \\ p_{111,109} \\ undef \end{pmatrix}.$$

Likewise for the RREQ messages sent by AP 200-4 to neighbors 200-2 and 200-1, because node 200-4 shares only the PLC interface with its neighbors 200-2 and 200-1. AP 200-4 transmits its RREQ messages to neighbors 200-2 and 200-1 over the shared PLC interface 210-2. The RREQ message sent to neighbor 200-2 may include an estimate of the cost $P_{4,2}$ associated with AP 200-4 using the PLC interface 210-2 to communicate with neighbor 200-2. Likewise, the RREQ message sent to neighbor 200-1 may include an estimate of the cost $P_{4,1}$ associated with AP 200-4 using the PLC interface 210-2 to communicate with neighbor 200-1.

As illustrated in FIG. 15, Node 200-4 may update its forwarding table 1501 entry for Destination 200-1 with itself listed as the source of the RREQ message, the SSN being inserted in the RREQ and a Timestamp of the current time.

Upon receiving the RREQ from AP 200-4, AP 200-3 may create or update an entry in its Forwarding Table 1502, for destination AP 200-1. For example, AP 200-3 may determine whether its forwarding table 1502 is expired by determining whether an elapsed time since the timestamp field (Time Stamp) associated with the entry for the destination AP 200-1 is greater than the route freshness duration threshold. Further, the AP 200-3 may determine if the Source Sequence Number (SSN) contained in the RREQ message indicates that the forwarding information contained within the RREQ message is fresher than the forwarding information stored in the forwarding table 1502 associated with AP 200-2.

If the forwarding table is expired or the forwarding information contained in the RREQ is newer than that stored in the forwarding table 1502, the AP 200-3 may set its forwarding table 1502 as shown in FIG. 15. For example, the AP 200-3 may set the value of Previous hop to AP 200-1, the Previous Interface to PLC, Cost to the cost of the interface 210-2 indicated in the received RREQ message, and SSN to the SSN extracted from the RREQ. The AP 200-3 may also update its timestamp to the time the RREQ message was processed.

AP 200-3 may forwards the RREQ via unicasts, to all its one-hop neighboring APs except for node 200-4, from whom AP 200-3 received the RREQ, namely APs 200-2 and 200-1. Similar to the process at AP 200-4, AP 200-3 estimates the cost of transmitting over each interface 210 shared with AP 200-2 and 200-1.

Further, AP 200-3 computes the aggregate cost over the routes from source AP 200-4 to each of AP 200-2 and 200-1.

Because AP 200-3 has multiple shared interfaces with AP 200-2, AP 200-3 computes the aggregate cost of two different routes. These two routes include a first route, using the wireless interface 210-1 to connect from AP 200-3 to AP 200-2, whose associated aggregate cost is the initial cost $P_{4,3}$ to reach AP 200-3 plus the cost $W_{3,2}$ of using the wireless interface to reach AP 200-2; and a second route, using the PLC interface 210-2 to connect from AP 200-3 to AP 200-2, whose associated cost is the initial cost $P_{4,3}$ plus the cost $P_{4,3}$ of using the PLC interface 210-2 to reach AP 200-2. These two costs may be expressed as:

$$\begin{pmatrix} w_{3,2} \\ p_{4,3} \\ - \end{pmatrix} \text{ and } \begin{pmatrix} - \\ P_{4,3} + P_{3,2} \\ - \end{pmatrix},$$

respectively

AP 200-3 may compare the costs of the two paths and unicast an RREQ to AP 200-2 only over the interface offering a smaller aggregate cost. For example, AP 200-3 may compare $W_{3,2}+P_{4,3}$ and $P_{4,3}+P_{3,2}$ and favor the one with the smaller cost. This RREQ message may include the aggregate interface cost from AP 200-4 to AP 200-3 including the cost utilizing the interface determined to have the smaller aggregate cost from the source AP 200-4 to AP 200-2.

Likewise, AP 200-3 may similarly compute the costs of transmitting to AP 200-1 directly. Since AP 200-3 only has a single shared interface with AP 200-1, AP 200-3 may automatically choose to forward the RREQ to node 200-1 along the shared PLC interface 210-2. This RREQ message may include the aggregate interface cost from AP 200-4 to AP 200-1 including the cost $P_{3,1}$ of transmitting over the shared PLC interface 210-2 shared therebetween.

Similar to AP 200-3, upon receiving node 200-4's RREQ, AP 200-2 and 200-1 also create or update an entry for Destination 200-1 in their forwarding tables. If a non-destination AP 200-ND receives multiple copies of the same RREQ, identified by the same SSN, from different APs 200, the non-destination AP 200-D may determine whether to forward the duplicate RREQs based on the aggregate cost estimate for the route listed therein. For example, the non-destination AP 200-ND may compare the Cost in its Forwarding Table entry set based on the earlier RREQ with the cost extracted from the later RREQs, and choose to forward only those later RREQs having a lower aggregate route cost from the source AP 200.

Assuming in this example, that AP 200-1 has received the RREQ with the lowest aggregate cost from AP 2000-3, AP 200-1 may update its forwarding table 1503 to set the Previous Hop as AP 200-3 and SSN as extracted from the RREQ. Further, AP 200-1 may set the Previous Interface as PLC, Cost as $P_{4,2}+P_{3,1}$, and update the timestamp as the time when it received the RREQ.

AP 200-1 may determine that it is the destination based on the Dest ID included in the RREQ packet, and, therefore, generate an RREP packet to propagate back upstream to the source 200-4.

AP 200-1 may send the RREP upstream such that the RREP packet traverses the same APs 200 as the APs 200 that the RREQ packet traversed, namely AP 200-3 and AP 200-4. At each AP 200, the determination of the next AP 200 on the upstream path may be determined using the previous hop (Prev. Hop) and previous hop interface (Prev. Hop Int.) information contained in the forwarding table entry for the source AP 200-4.

Each node along the upstream route may complete their corresponding forwarding table based on the information contained within the RREP message. For example, AP 200-3 and 200-4 may update their forwarding table entry for destination 200-1 as shown in forwarding tables 1504 and 1505, respectively, based on information from the RREP message.

The routing table includes costs incurred on each interface in the direction of the designated destination AP 200-D. The proposed routing table can accommodate cost for multiple interfaces 210. Further, the routing table may also accommodate costs for a combination of interfaces 210 across multiple APs 200 in the route to the destination AP 200-D obtained via the Route discovery procedure. In contrast to the conventional techniques, the HyMN network may utilize a single routing table that incorporates the costs from different interfaces 210, which are utilized to realize an end-to-end route across multiple APs 200 that may each traverse the data over different collision domains.

In the example network topology in FIG. 14, due to the relatively large distance between AP 200-4 and AP 200-1 and the ceiling therebetween, AP 200-4 and AP 200-1 may not share a link over the wireless medium 325. Thus, even though AP 200-4 and AP 200-1 both have a Wi-Fi interface 210-1 they do not share wireless signals therebetween. Because the WiFi signals from AP 200-4 and AP 200-1 may not interfere with one another, AP 200-4 may transmit to AP 200-3 over its shared Wi-Fi interface 210-1 with AP 200-3 and AP 200-1 may concurrently transmit to AP 200-2.

This concurrent communication may be improved through the use of a Cocktail Party Side Conversation operation, as discussed in U.S. patent application Ser. No. 13/972,736, titled: Cocktail party: side conversations and talking over in wireless mesh networks, the entire contents of which are hereby incorporated by reference. In a Cocktail Party Side Conversation operation, during transmission, the AP 200-1 and/or AP 200-4 may lower their respective power to increase the efficiency of the concurrent transmissions. For example, the APs 200 may include instructions that, when executed, configure their associated processors 230 to lower the power used by their respective interfaces 210 while forwarding the data packets in operation 970, the RREQ message in operation 1160 and/or the RREP message in operation 1340.

By facilitating efficient concurrent communications, the aggregate cost on the shared medium (collision domain) may be decreased. Further, if one or more of the APs 200 perform Cocktail Party conversations, these APs 200 may be given a weighing factor in the cost computations such that the cocktail party conversion enabled APs 200 are favored.

Additionally, in the example network topology in FIG. 14, the data exchanged between the APs 200 may be sensitive to a transmission delay jitter, for example, data containing audio and/or video streams. To account for this sensitivity, one or more of the APs 200 may equalize the transmission delay in the network, as discussed in U.S. patent application Ser. No. 13/622,891 titled: System and Method for Equalizing Transmission Delay in a Network, the entire contents of which are hereby incorporated by reference. For example, one or more of the APs 200, may include software that, when executed, instruct an associated processor 230 to determine whether the data transmitted therebetween contains audio and/or video streams based on a header associated therewith and, if the data is sensitive to transmission delay jitter, process the packet differently. For example, the AP 200 may manipulate a timestamp associated therewith and/or a transmission time of the data packet to reduce the transmission delay jitter.

As above, example embodiments have been described. In the above-described example embodiments, the functions performed by the APs 200 may be implemented with a 'module'. The 'module' includes a software element or a hardware element, such as a field programmable gate array (FPGA) or an application specific integrated circuit (ASIC), and the module may perform functions. However, the module is not limited to software or hardware. The module may be configured to be in a storage medium that may address the module or to execute one or more processors.

As an example, the module may include elements, such as software elements, object-oriented software elements, class elements, and task elements, processes, functions, properties, procedures, subroutines, segments for a program code, drivers, firmware, micro-codes, circuits, data, databases, data structures, tables, arrays, and variables. Functions provided by elements and modules may be combined with a small number of elements and modules or may be subdivided into additional elements and modules. Furthermore, the elements and modules may execute one or more central processing units (CPUs) within a device.

Some example embodiments may be embodied through a medium including a computer-readable code/command for controlling at least one processing element of the above-described embodiments, for example, a computer-readable medium. The medium may correspond to a medium/mediums that enable storage and/or transmission of the computer-readable code. The medium may be non-transitory.

In an illustrative embodiment, the computer-readable code is recorded in a medium or transmitted through the Internet. Examples of the medium include read-only memory (ROM), random-access memory (RAM), CD-ROMs, magnetic tapes, floppy disks, optical data storage devices, and carrier waves such as data transmission through the Internet. The medium may also be a non-transitory computer-readable medium. Since the mediums can also be distributed networks, the computer-readable code can be stored, transmitted, and executed in a distributed fashion. Furthermore, for example, the processing element may include a processor or a computer processor, and the processing element may be distributed and/or included in one device.

Although a few example embodiments have been shown and described, it would be appreciated by those skilled in the art that changes may be made in these embodiments without departing from their principles and spirit, the scope of which is defined in the claims and their equivalents.

At least one example embodiment relates to an access point configured to route data within a network from a source to a destination.

In at least one embodiment, the access point includes at least two interfaces configured to interface to other access points over a link layer therein using heterogeneous backhaul access technologies; and a memory having machine executable code therein that when executed by a processor cause the processor to determine a next-hop interface and a next-hop access point from the at least two interfaces and the other access points, respectively, to utilize when routing the data from the source to the destination.

In at least one embodiment, each of the at least two interfaces has a Media Access Control (MAC) address associated therewith, and the machine executable code, when executed by the processor, causes the processor to route the data to the MAC address associated with the next-hop interface.

In at least one embodiment, the machine executable code, when executed by the processor, causes the processor to determine the next-hop interface and the next-hop access point to utilize based on a forwarding table stored within the memory of the access point.

In at least one embodiment, the machine executable code, when executed by the processor, causes the processor to determine the next-hop interface and the next-hop access point if a header of the data indicates that a recipient thereof is not serviced by the access point.

In at least one embodiment, the machine executable code, when executed by the processor, causes the processor to determine the next hop interface and the next-hop access point by, performing a route discovery if the forwarding table does not contain an unexpired entry for the destination therein; determining the next-hop interface and the next-hop access point from the at least two interfaces and the other access points, respectively, using an updated forwarding table received in response to the route discovery; and forwarding the data to the next-hop access point over the next hop-interface having a lowest aggregate cost from the source to the destination as indicated by the forwarding table.

In at least one embodiment, the next-hop access point and the next hop-interface having the lowest aggregate cost are an access point and interface combination from the at least two interfaces and the other access points, respectively, that have a lowest estimated time duration for transmission of the data downstream to towards the destination.

In at least one embodiment, the machine executable code, when executed by the processor, causes the processor to perform the route discovery by, propagating a route request message downstream to the destination such that the route request message includes an estimate of the cost associated with the interfaces chosen by each prior access point upstream in a route between the source and the access point; updating, in the forwarding table, the aggregate cost associated with transmitting data from the access point to the destination based on a route reply message from the destination received in response to the route request message; and propagating the route reply message further upstream to another access point, if the access point is not the source.

In at least one embodiment, the backhaul access technologies that are heterogeneously utilized by the at least two interfaces allow the access point to select different collision domains to transmit the data therethrough.

In at least one embodiment, the collision domains include two or more of a wireless medium, an Ethernet cable, a Coaxial cable and a power line carrying alternating current thereon.

In at least one embodiment, the machine executable code, when executed by the processor, causes the processor to forward the data to the next-hop access point over the next-hop interface without resolving an internet protocol (IP) layer 3 address associated therewith.

At least one example embodiment relates to a method of routing data by an access point within a network from a source to a destination.

In at least one embodiment, the access point includes at least two interfaces and a memory, the at least two interfaces configured to interface to other access points over a link layer therein using heterogeneous backhaul access technologies.

In at least one embodiment, the method includes determining a next-hop interface and a next-hop access point from the at least two interfaces and the other access points, respectively, to utilize when routing the data from the source to the destination.

In at least one embodiment, each of the at least two interfaces has a Media Access Control (MAC) address associated therewith and the method includes routing the data to the MAC address associated with the next-hop interface.

In at least one embodiment, deter mining the next-hop interface and the next-hop access point to utilize is based on a forwarding table stored within the memory of the access point.

In at least one embodiment, the determining the next-hop interface and the next-hop access point, is performed if a header of the data indicates that a recipient thereof is not serviced by the access point.

In at least one embodiment, the deter mining the next hop interface and the next-hop access point includes, performing a route discovery if the forwarding table does not contain an unexpired entry for the destination therein; determining the next-hop interface and the next-hop access point from the at least two interfaces and the other access points, respectively, using an updated forwarding table received in response to the route discovery; and forwarding the data to the next-hop access point over the next hop-interface combination having a lowest aggregate cost from the source to the destination as indicated by the forwarding table.

In at least one embodiment, the route discovery includes propagating a route request message downstream to the destination such that the route request message includes an estimate of the cost associated with the interfaces chosen by each prior access point upstream in a route between the source and the access point; updating, in the forwarding table, the aggregate cost associated with transmitting data from the access point to the destination based on a route reply message from the destination received in response to the route request message; and propagating the route reply message further upstream to another access point, if the access point is not the source.

At least one example embodiment relates to an access point N1 configured to route data within a network having other access points N2, N3 and N4 based on a cocktail party side conversation operation.

In at least one embodiment, the processor may include a first set of instructions stored in the program memory that, when executed, determine whether N3 is actively communicating with N4 and, if so, then determining whether packets are stored in the data storage memory that are to be transmitted by N1 to N2; a second set of instructions stored in the program memory that, when executed, determine whether N2 is not capable of receiving signals transmitted from N3 and, if so, then determining how many packets can be sent to N2 from N1 with their receipt by N2 acknowledged in the remaining time that N3 is actively communicating with N1 and gathering those packets; a third set of instructions stored in the program memory that are adapted to be executed after the second set of instructions are executed to gather packets, the third set of instructions, when executed, causing the gathered packets to be transmitted to N2 from N1 at the same time that N3 is actively transmitting with N4.

In at least one embodiment, the wireless network is a wireless mesh network.

In at least one embodiment, the wireless mesh network is compliant with the 802.11 standards.

In at least one embodiment, the second set of instructions determines the length of time that N3 is actively communicating with N4 by reference to time information stored in a media access control header.

At least one example embodiment relates to a method of concurrent transmission of multiple radio-frequency signals between a plurality of transmitting and receiving nodes In at least one embodiment, each node collects available information from nodes located within one-hop neighborhood from each other; each node maintains and becomes aware of at least two-hops neighborhood information; wherein a first node from the a plurality of nodes, based on the two-hops neighborhood information, selects and establishes communication with at least one of the nodes located within one-hop neighborhood of said first node; wherein a second node from the plurality of nodes, based on the two-hops neighborhood information, selects and establishes communication with at least one of the nodes located within one-hop neighborhood of said second node after completing a set of instructions using the available information obtained from at least a particular node; and wherein the first node communication with at least one of the one-hop neighborhood nodes is independent from second node communication with at least one of the one-hop neighborhood nodes.

In at least one embodiment, the second node is one of the at least one-hop neighborhood nodes of the first node.

In at least one embodiment, the available information includes a beacon, wherein the beacon includes at least the one-hop neighbor information.

In at least one embodiment, the one-hop neighbor information are selected from neighbor identification, neighbor signal strength, duration of transmission, transmitter's identification and receiver's identification.

In at least one embodiment, each node maintaining and becoming aware of at least two-hops neighborhood information is selected from beacons, packets and a manual setup.

In at least one embodiment, the method is implemented in a mesh network.

In at least one embodiment, the mesh network is compliant with the 802.11 standards.

In at least one embodiment, the set of instructions include a first set of instructions stored in a program memory that, when executed, determine whether a third node is actively communicating with a fourth node and, if so, then determining whether packets are stored in a data storage memory that are to be transmitted by a first node to second node; a second set of instructions stored in the program memory that, when executed, determine whether second node is not capable of receiving signals transmitted from third node and, if so, then determining how many packets can be sent to second node from first node with their receipt by second node acknowledged in the remaining time that third node is actively communicating with first and gathering those packets; a third set of instructions stored in the program memory that are adapted to be executed after the second set of instructions are executed to gather packets, the third set of instructions, when executed, causing the gathered packets to be transmitted to second node from first node at the same time that third node is actively transmitting with fourth mode.

In at least one embodiment, the set of instructions include a first set of instructions stored in the program memory that, when executed, determine and stored wireless available information of surrounding nodes, wherein the available information includes nodes identification, achievable throughput between nodes, and interference strength; a second set of instructions stored in the program memory that, when executed, determine whether a first node from the plurality of nodes is actively communicating with a second node from the plurality of nodes and, if so, then determining whether packets are stored in the data storage memory that are to be transmitted by a third node from the plurality of nodes to a fourth node from the plurality of nodes; a third set of instructions stored in the program memory that, when executed, determine whether the fourth node is capable of receiving signals transmitted from the first node and, if so, then the third node based on available information between the first mode to second node and first node to fourth node determine if the third node initiates communication with the fourth node; and a fourth set of instructions stored in the program memory that are adapted to be executed after the third set of instructions are executed to gather packets causing the gathered packets to be transmitted to second node from first node at the same time that third node is actively transmitting with fourth mode.

At least one example embodiment relates to a method for concurrent transmission of multiple radio-frequency signals between several access points.

In at least one embodiment, the access points include a plurality of nodes, wherein each node includes a data storage memory, a program memory, an RF circuit operatively coupled to an antenna, a processor operative coupled to the RF circuit and the at least one memory; a first set of instructions stored in the program memory that, when executed, determine and stored wireless available information of surrounding nodes, wherein the wireless available information includes nodes identification, achievable throughput between nodes, and interference strength; a second set of instructions stored in the program memory that, when executed, determine whether a first node from the plurality of nodes is actively communicating with a second node from the plurality of nodes and, if so, then determining whether packets are stored in the data storage memory that are to be transmitted by a third node from the plurality of nodes to a fourth node from the plurality of nodes; a third set of instructions stored in the program memory that, when executed, determine whether the fourth node is capable of receiving signals transmitted from the first node and, if so, then the third node based on wireless available information between the first mode to second node and first node to fourth node determine if the third node initiates communication with the fourth node; and a fourth set of instructions stored in the program memory that are adapted to be executed after the third set of instructions are executed to gather packets causing the gathered packets to be transmitted to second node from first node at the same time that third node is actively transmitting with fourth mode.

In at least one embodiment, the second node is one of the at least one-hop neighborhood nodes of the first node.

In at least one embodiment, the first node is selected from an access point, a gateway, a video bridge and a station.

In at least one embodiment, the wireless network includes a wireless mesh network.

In at least one embodiment, the wireless mesh network is compliant with the 802.11 standards.

In at least one embodiment, each node comprises with adjustable transmission power.

At least one example embodiment relates to a first node of a wireless network for concurrent transmission of multiple radio-frequency signals between a plurality of transmitting and receiving nodes.

In at least one embodiment, the network includes a plurality of nodes, wherein each node collects wireless available information from nodes located within one-hop neighborhood from each other; each node maintaining and becoming aware of at least two-hops neighborhood information; wherein a first node from the a plurality of nodes, based on the two-hops neighborhood information, selects and establishes communication with at least one of the one-hop neighborhood nodes; wherein a second node from the plurality of nodes, based on the two-hops neighborhood information, selects and establishes communication with another node of the at least one one-hop neighborhood nodes after verifying the wireless available information obtained from the first node; and wherein the first node's communication with at least one of the one-hop neighborhood nodes is independent from second node communication with at least one of the one-hop neighborhood nodes.

At least one example embodiment relates to an access point configured to reduce a transmission delay jitter.

In at least one embodiment, the network device includes an antenna connected to an RF chip; a processor operatively coupled to an Ethernet port, an RF chip, a program memory, a packet buffer memory, a pointer buffer memory, and a program memory; wherein the program memory contains a first set of instructions that, when executed by the processor, cause a plurality of packets that are received by the antenna and the RF chip in a first order to be stored in the packet buffer memory in that first order; wherein the program memory contains a second set of instructions that, when executed by the processor, cause a pointer associated with each one of the plurality of packets to be stored in the pointer buffer memory; wherein the program memory contains a third set of instructions that, when executed by the processor, cause the pointers stored in the pointer buffer memory to be placed in a second order with a timestamp that is included with each packet that is not recognizable at a player level; and wherein the program memory contains a fourth set of instructions that, when executed by the processor, cause the packets stored in the packet buffer memory to be removed therefrom and passed along to the Ethernet port in accordance with the sorted pointer to each packet stored in the pointer buffer memory.

In at least one embodiment, the timestamp is at the end of each packet.

In at least one embodiment, the timestamp is included in the packet at the time it is received by the network device.

In at least one embodiment, the network device includes a video bridge.

In at least one embodiment, the packet includes a destination address and the network device does not modify such destination address.

In at least one embodiment, the fourth set of instructions that, when executed, cause the packet from the packet buffer memory to be passed along in response to receipt of a further packet.

In at least one embodiment, the packets include a payload that is associated with at least one of video or audio data.

In at least one embodiment, the network device is associated with a client device and the second set of instructions that, when executed, cause only pointers to packets in the packet buffer memory that are associated with the client device to be stored in the pointer buffer memory.

In at least one embodiment, the client device includes a video player.

In at least one embodiment, the plurality of packets is received from the Internet.

In at least one embodiment, the network device is operated in a local area network and the first set of instruction that, when executed, cause packets to be received from another device operating in such network.

What is claimed is:

1. An access point configured to pair with other access points in a network, the access point comprising:
    at least two interfaces configured to interface to other access points over a link layer therein using heterogeneous backhaul access technologies; and
    a memory having machine executable code therein that, when executed by a processor, cause the at least two interfaces to pair with one or more of the other access points using configuration information stored within the memory, wherein the backhaul access technologies that are heterogeneously utilized by the at least two interfaces allow the access point to select different collision domains to communicate with the other access points by,
    determining an aggregate running cost that is dynamically updated along a route from a source access point of the other access points to the access point, and
    determining a most efficient next hop on a path from the source access point to a destination access point of the other access points based on the aggregate running cost and costs associated with the at least two interfaces that utilize different collision domains.

2. The access point of claim 1, wherein the machine executable code, when executed by the processor, causes the processor to pair with the other access points by,
    determining if the access point is a registrar or an enrollee based on whether the access point possesses configuration information that is valid for the network;
    establishing a secure connection to one of the other access points;
    receiving, over the secure connection, the configuration information from the other access point, if the determining determines that the access point is the enrollee; and
    sending, over the secure connection, the configuration information to the other access point, if the determining determines that the access point is the registrar; and
    interfacing, the at least two interfaces, to one or more of the other access points via a link layer connection therebetween based on the configuration information.

3. The access point of claim 2, wherein the machine executable code, when executed by the processor, causes the processor to interface the at least two interfaces to the one or more other access points based on a Media Access Control (MAC) address associated with interfaces of the one or more other access points.

4. The access point of claim 1, wherein the machine executable code, when executed by the processor, causes the processor to initiate a pairing procedure in response to a user request to pair with the one or more other access points such that upon receiving the user request the pairing procedure with the one or more other access points is performed autonomously.

5. The access point of claim 1, wherein, upon interfacing to the one or more other access points, the machine executable code, when executed by the processor, causes the processor to,
    update a forwarding table stored within the memory based on the determined aggregate running cost.

6. The access point of claim 1, wherein the machine executable code, when executed by the processor, causes the processor to,
    set the access point as a registrar if network parameters thereat change; and
    send, over a secure connection, updated configuration information to the other access points, the updated configuration information including an indication of the changed network parameters.

7. The access point of claim 6, wherein the machine executable code, when executed by the processor, causes the processor to increment a configuration sequence number associated with the updated configuration information if the network parameters thereat change.

8. A method of pairing access points in a network, the method comprising:
    configuring at least two interfaces of an access point to interface to other access points over a link layer therein using heterogeneous backhaul access technologies; and
    pairing the at least two interfaces with one or more of the other access points using configuration information stored within a memory of the access point, wherein the backhaul access technologies that are heterogeneously utilized by the at least two interfaces allow the access point to select different collision domains to communicate with the other access points by,
    determining and dynamically updating an aggregate running cost along a route from a source access point of the other access points to the access point, and
    determining a most efficient next hop on a path from the source access point to a destination access point of the other access points based on the aggregate running cost and costs associated with the at least two interfaces that utilize different collision domains.

9. The method according to claim 8, wherein the method further comprises:
    determining if the access point is a registrar or an enrollee based on whether the access point possesses configuration information that is valid for the network;
    establishing a secure connection to one of the other access points;

receiving, over the secure connection, the configuration information from the other access point, if the determining determines that the access point is the enrollee; and sending, over the secure connection, the configuration information to the other access point, if the determining determines that the access point is the registrar; and interfacing, the at least two interfaces, to one or more of the other access points via a link layer connection therebetween based on the configuration information.

10. The method according to claim 8, wherein the interfaces are configured based on a Media Access Control (MAC) address associated with interfaces of the one or more other access points.

11. The method according to claim 8, wherein pairing is initiated as a procedure in response to a user request to pair with the one or more other access points such that upon receiving the user request the pairing procedure with the one or more other access points is performed autonomously.

12. The method according to claim 8, wherein, upon interfacing to the one or more other access points, the method further comprises:
updating a forwarding table stored within the memory based on the determined aggregate running cost.

13. The method according to claim 8, wherein the method further comprises:
setting the access point as a registrar if network parameters thereat change;
sending, over a secure connection, updated configuration information to the other access points, the updated configuration information including an indication of the changed network parameters, and
incrementing a configuration sequence number associated with the updated configuration information if the network parameters thereat change.

14. A non-transitory computer readable storage medium storing program code that, when executed by a processor, configures the processor to,
configure at least two interfaces of an access point to interface to other access points over a link layer therein using heterogeneous backhaul access technologies; and
pair the at least two interfaces with one or more of the other access points using configuration information stored within a memory of the access point, wherein the backhaul access technologies that are heterogeneously utilized by the at least two interfaces allow the access point to select different collision domains to communicate with the other access points by,
determining and dynamically updating an aggregate running cost along a route from a source access point of the other access points to the access point, and
determining a most efficient next hop on a path from the source access point to a destination access point of the other access points based on the aggregate running cost and costs associated with the at least two interfaces that utilize different collision domains.

15. The access point according to claim 1, wherein the access point is configured to,
determine whether each collision domain of the different collision domains is associated with a shared medium or an unshared medium, wherein
the aggregate running cost associated with the shared medium is based on a cost of each of a plurality of interfaces along the route and the aggregate running cost associated with the unshared medium is based on which one of the plurality of interfaces along the route has a highest cost.

16. The access point according to claim 1, wherein the access point is configured to,
prioritize data packets receivable at the access point, and process the data packets based on the prioritization.

17. The access point according to claim 1, wherein the access point is configured to,
transmit a Route Request message to determine the aggregate running cost, and
transmit a Route Reply message to determine the costs of the at least two interfaces.

18. The access point according to claim 17, wherein the access point is configured to transmit the Route Request message and the Route Reply message by unicasting same directly to the interface of a neighboring access point.

19. The method according to claim 8, wherein
the costs associated with the least two interfaces that utilize different collision domains are based on link capacities to use the at least two interfaces, and
the link capacities are based on at least one of a Signal to Noise Ratio and a Received Signal Strength Indicator (RSSI).

20. The method according to claim 8, further comprising:
determining whether each collision domain of the different collision domains is associated with a shared medium or an unshared medium, wherein
the aggregate running cost associated with the shared medium is based on a cost of each of a plurality of interfaces along the route and the aggregate running cost associated with the unshared medium is based on which one of the plurality of interfaces along the route has a highest cost.

21. The method according to claim 8, further comprising:
prioritizing data packets receivable at the access point; and
processing the data packets based on the prioritization.

22. The method according to claim 8, further comprising:
transmitting a Route Request message to determine the aggregate running cost; and
transmitting a Route Reply message to determine the costs of the at least two interfaces.

23. The method according to claim 22, wherein the access point is configured to transmit the Route Request message and the Route Reply message via unicasting same directly to the interface of a neighboring access point.

* * * * *